United States Patent [19]

Woolfson

[11] 4,060,830
[45] Nov. 29, 1977

[54] VOLUMETRIC BALANCE VIDEO TRACKER

[75] Inventor: Martin G. Woolfson, Baltimore, Md.

[73] Assignee: Westinghouse Electric Corporation, Pittsburgh, Pa.

[21] Appl. No.: 734,928

[22] Filed: Oct. 22, 1976

[51] Int. Cl.² .............................................. H04N 7/18
[52] U.S. Cl. ............................... 358/126; 250/203 CT
[58] Field of Search ............................... 358/125, 126; 250/203 CT

[56] References Cited

U.S. PATENT DOCUMENTS

| 3,562,423 | 2/1971 | Murphy | 358/126 |
| 3,950,611 | 4/1976 | Callis | 358/126 |
| 3,953,670 | 4/1976 | Prince | 358/125 |

Primary Examiner—Howard W. Britton
Attorney, Agent, or Firm—H. W. Patterson

[57] ABSTRACT

A video tracker for controlling the scanning of a sensor in an electro-optical tracking system in which the track point for the sensor is determined by balancing a volume signal from a first half of the track window with a volume signal from the second half of the track window in both horizontal and vertical directions of the track window to provide azimuth and elevation error signals. The volume signal for each half of the track window is determined by the product of the area of the corresponding half of the track window and the amplitude of the average linear video signal within that portion of the track window. Further, a multiplexed, time domain multiplier compares the gain of the azimuth and elevation error signals in successive fields of the sensor to normalize the gain of the azimuth and elevation error signals with respect to the displacement of the volumetric centroid of the target from the center of the track window.

15 Claims, 9 Drawing Figures

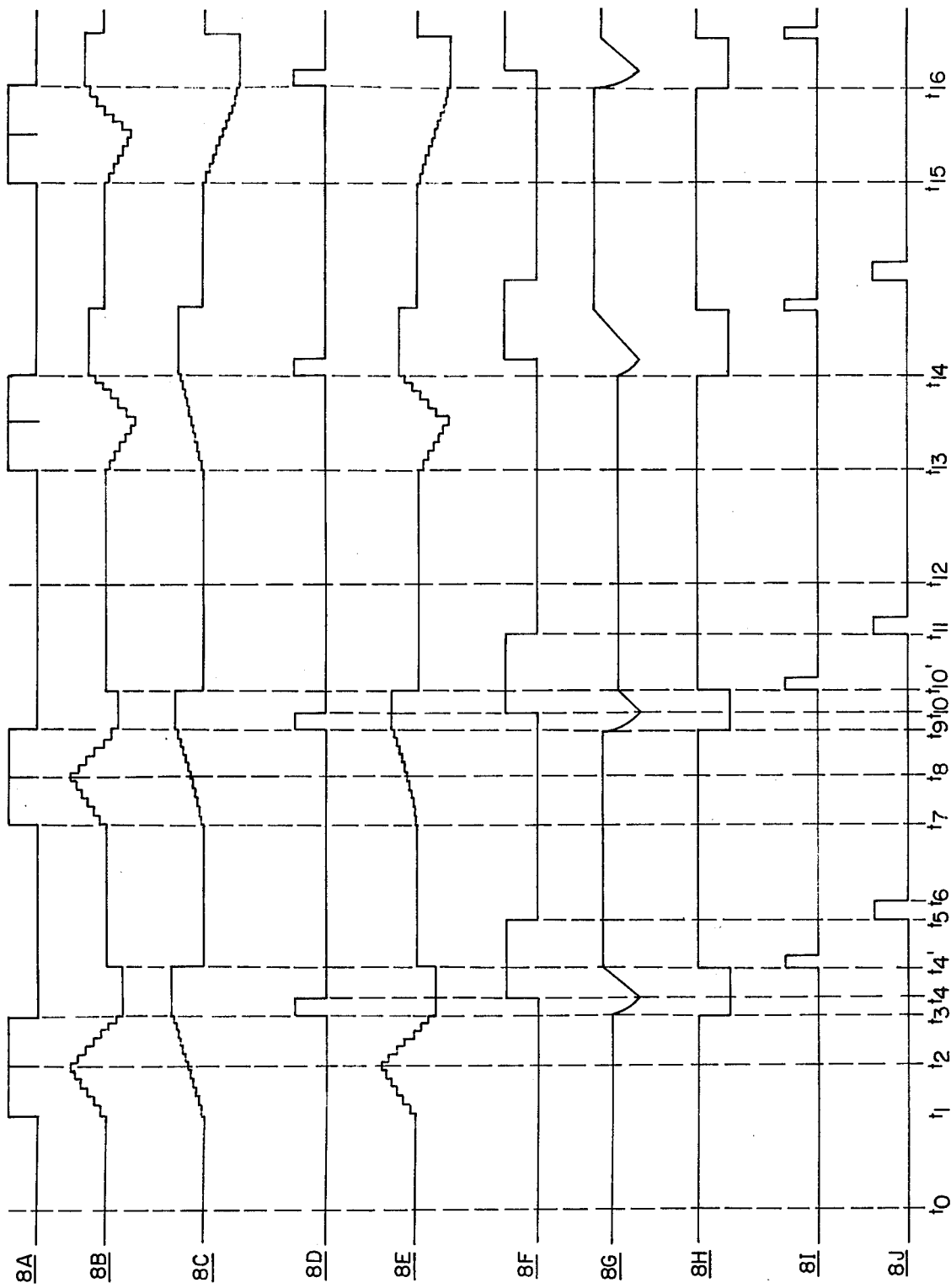

VOLUMETRIC BALANCE VIDEO TRACKER

BACKGROUND OF THE INVENTION

1. Field of the Invention

The present invention relates to video trackers for electro-optical systems, and, more particularly, to video trackers which are responsive to a linear video signal to provide azimuth and elevation error signals that are normalized with respect to the displacement of the volumetric centroid of the target from the center of the tracking window.

2. Description of the Prior Art

In the prior art, video trackers have been developed for controlling the scanning of a sensor in an electro-optical tracking system. Generally, these prior art trackers employed a threshold mechanism to produce binary video signals, sometimes also referred to as black/white video signals. These binary video signals are then processed to provide azimuth and elevation error signals for controlling the scanning of the sensor. However, these threshold type trackers required a means to determine the appropriate threshold value at which the threshold mechanism was to operate and a means to maintain the established threshold value. These means for determining and maintaining the appropriate threshold value required relatively complex and, consequently, expensive circuitry making these threshold type trackers too expensive for use in an austere electro-optical tracking system in which the tracking function must be performed with minimum cost and circuit complexity.

Another type of video tracker used in prior art electro-optical systems differentiated the video signals to detect target edges. However, this type of tracker has proven to be susceptible to false targets produced by background clutter returns. Also, as with the threshold type trackers, these differentiation type trackers required circuitry of a complexity that made them too expensive for use in austere electro-optical tracking systems.

Also, prior art trackers have developed mechanisms for regulating the azimuth and elevation error signals in terms of volts per degree of measured error or other suitable measurement parameter. However, these error signal regulated trackers had significant limitations, such as, for example, the requirement that the target be completely enclosed within the tracking window.

Therefore, there was a need in the prior art for a tracker of relatively low circuit complexity making it suitable for use on austere electro-optical tracking systems, but which would, nevertheless, provide adequate tracking performance. Also, there was a need in the prior art to regulate, or normalize, the tracking error signals with respect to a suitable measurement parameter such that the normalization process would be operative over a broad range of potential tracking conditions.

SUMMARY OF THE INVENTION

In accordance with the present invention, a video tracker is responsive to linear video signals to provide normalized azimuth and elevation error signals for controlling the scanning of a sensor in an electro-optical tracking system. The video tracker includes a time modulator that provides early and late gate signals which define first and second halves of a tracking window for both the horizontal and vertical dimensions of the sensor field of view. A time discriminator integrates the video signals that occur within the first and second halves of the tracking window; and azimuth and elevation accumulators that are responsive to the time discriminator add the integrated linear video signals over the entire tracking window defined by the early and late gate signals of the time modulator to provide azimuth and elevation error signals. A target gain control is responsive to the error signals of the azimuth and elevation accumulators for successive fields of view of the optical sensor to determine a normalization factor for the gain of the azimuth and elevation error signals with respect to a predetermined measurement parameter and then normalizes the gain of the error signals in relation to this normalization factor.

BRIEF DESCRIPTION OF THE DRAWINGS

FIG. 8 illustrates waveforms which describe the operation of the target gain control shown in FIG. 2 and further described in FIG. 6.

DESCRIPTION OF THE PREFERRED EMBODIMENT

Figure 1:
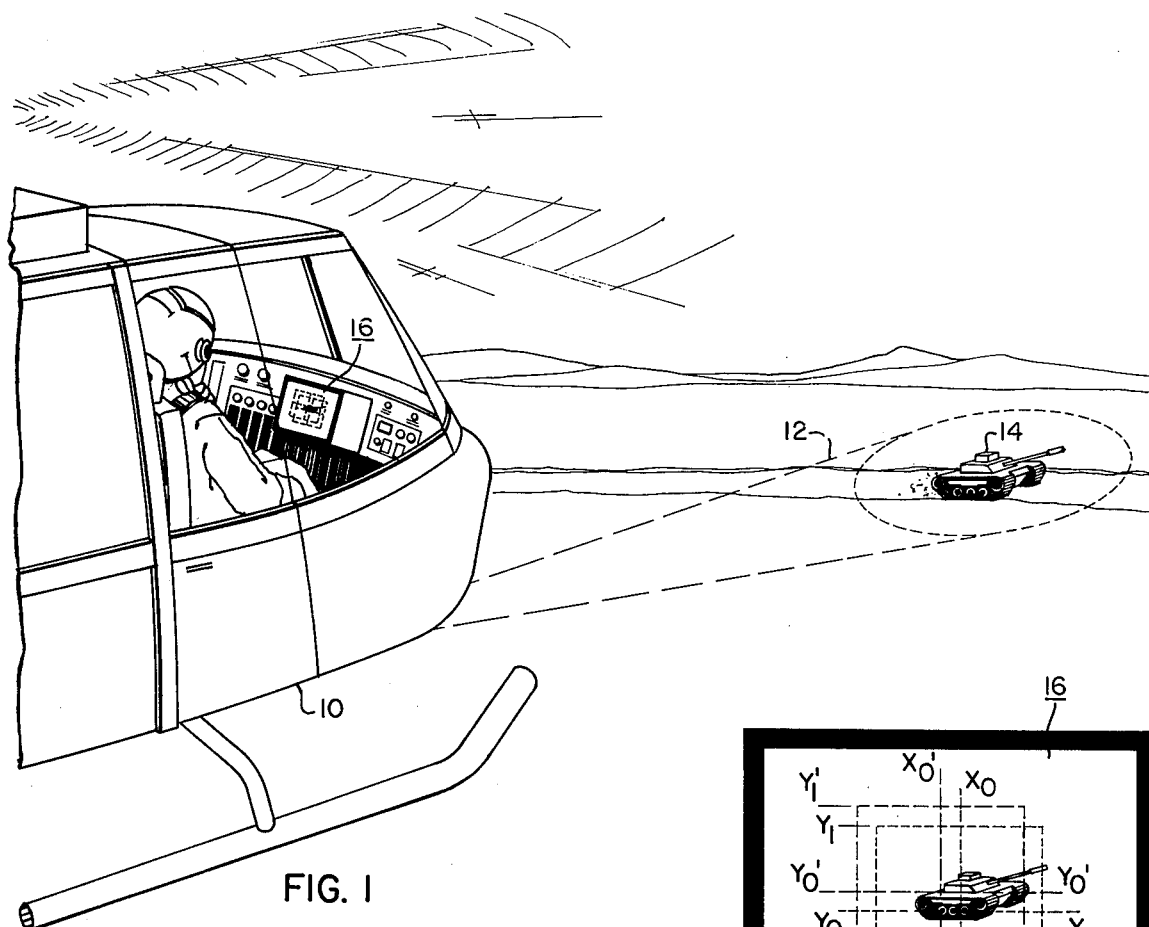
FIG. 1 illustrates a physical application of an electro-optical tracking system that includes the volumetric balance tracker of the present invention.

The physical application of an electro-optical tracking system which includes the disclosed video tracker for controlling the scanning of the optical sensor is illustrated in FIG. 1. In FIG. 1, a helicopter 10 includes the tracking system which controls the field of view 12 of an optical sensor such as a camera. This field of view 12 is directed towards a target which is illustrated in FIG. 1 as a tank 14. The field of view of the camera is shown on the display screen 16 which is mounted in the control panel of the helicopter 10. Once the target is acquired, the electro-optical control system provides azimuth and elevation error signals to control the scanning of the camera such that the tank 14 is maintained within the field of view 12 despite pitch and yaw motions of the helicopter 10 with respect to the tank 14. Therefore, as the helicopter 10 makes a typical maneuver about the target 14, the disclosed tracking system will cause the optical sensor to maintain its field of view 12 on the target 14. Equivalently, if the helicopter 10 remains stationary with respect to the earth, the tracking system also causes the optical sensor to maintain its field of view on the target despite motion of the tank 14 with respect to the earth.

Figure 1A:
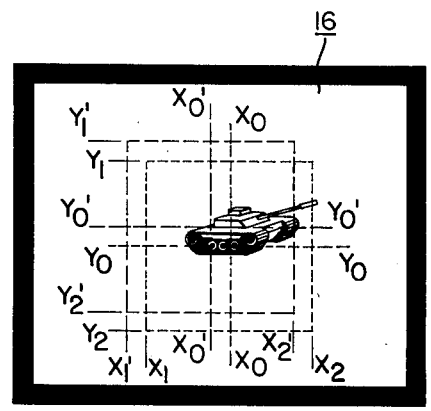
FIG. 1A is an exploded view of the video display shown in FIG. 1 which illustrates tracking windows corresponding to first and second fields of the electro-optical tracking system.

The sensor field of view as seen through the display 16 which is mounted in the control panel of the helicopter 10 is shown in the exploded view of FIG. 1A which illustrates that, not only does the sensor maintain the target within its field of view, but the target is maintained within a defined portion of the sensor field of view. As is familiar to those skilled in the art, the portion of the field of view is referred to as a tracking window within the sensor field of view. The optical display 16 which, for example, could be a television receiver, is comprised of an array of photoelectric devices arranged in horizontal rows and vertical columns. These photoelectric devices are illuminated by an electron beam that scans across each horizontal row as it moves down the vertical columns of the array. The image of the field of view is reproduced on the display 16 by controlling the intensity of the electron beam as it scans over these photoelectric devices.

The tracking window within the field of view is defined by boundaries in the horizontal ($x$) and vertical ($y$) dimensions of the display 16. The center of the tracking window is defined by the $x_0$ dimension of the horizontal rows and the $y_0$ dimension of the vertical columns. As will be explained in relation to FIG. 2 and as further explained in relation to FIGS. 4 through 7, the disclosed volumetric balance video tracker tracks the target 14 by determining the deviation of the center of the tracking window with respect to the volumetric centroid or balanced center of the integrated video signals representing the target 14. As further explained in relation to FIGS. 2 through 8, the disclosed tracker also tracks the deviation of the volumetric centroid of the target 14 from the center of a second tracking window defined by the $x'_0$ and $y'_0$ dimensions of the display 16 to normalize the tracking error signals with respect to the displacement of the volumetric centroid of the target from the center of one of the tracking windows.

While FIG. 1 illustrates the implementation of the disclosed tracker in an electro-optical tracking system carried aboard a helicopter 10, it is to be understood that the disclosed video tracker is intended for use on any austere electro-optical tracking system and, therefore, could also find application in an expendable, reconnaissance type vehicle.

Although the display 16 is not essential to the operation of the disclosed electro-optical tracking system or the video tracker contained therein, the display 16 has been presented in FIG. 1 to aid in the description of the operation of the disclosed video tracker.

Figure 2:
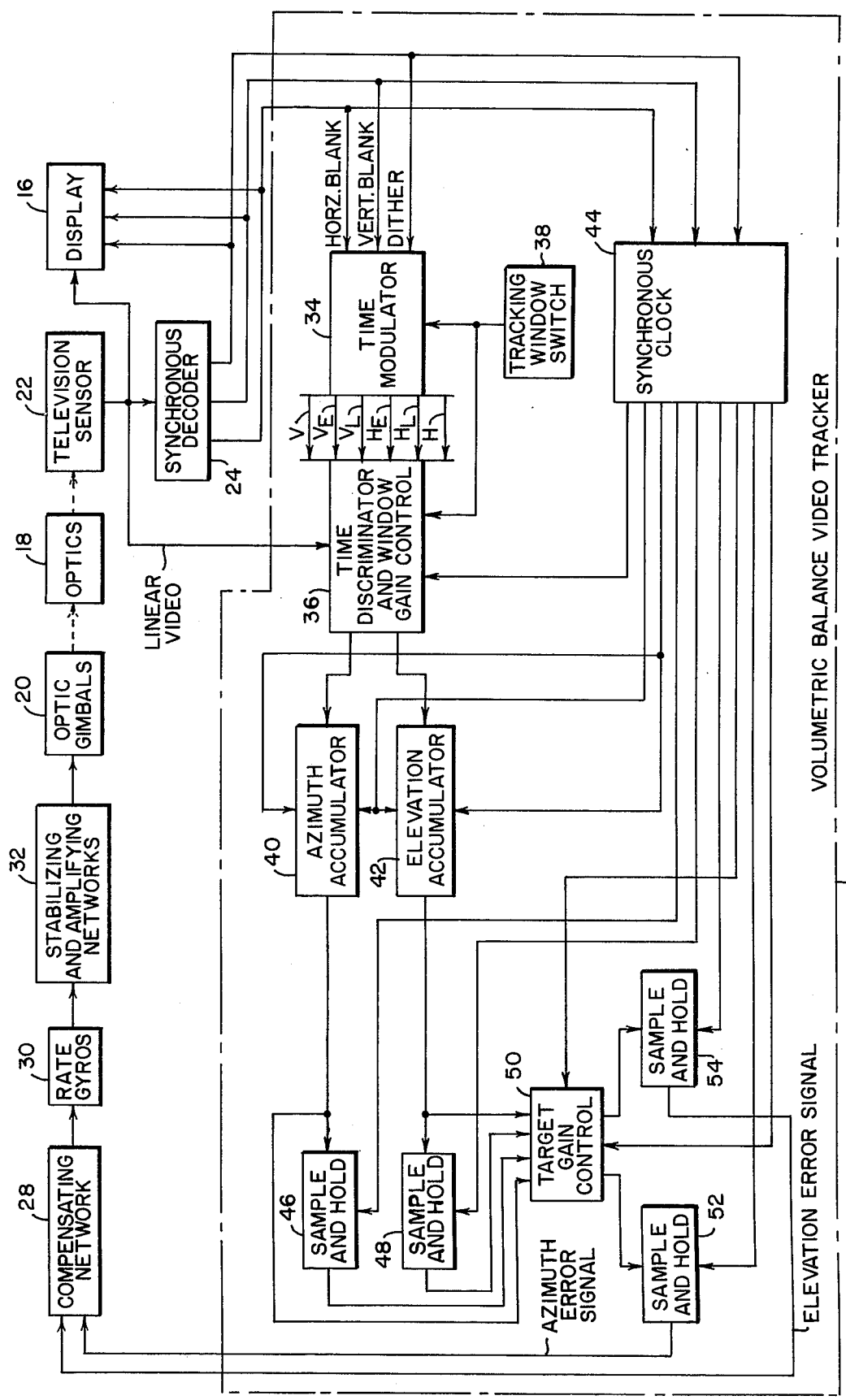
FIG. 2 is a block diagram of the electro-optical tracking system whose operation is illustrated in FIG. 1 and, more particularly, shows a basic block diagram of the disclosed volumetric balance video tracker.

The electro-optical tracking system carried aboard the helicopter 10 and the video tracker contained in the tracking system are further described in the block diagram of FIG. 2. The electro-optical tracking system includes an optics set 18 which, in the preferred embodiment is comprised of a mirror, but could also be comprised of optical lenses or other similar device. The optics 18 are supported by a set of optic gimbals 20. The position of the optics 18 determine the field of view of a television sensor 22 which is comprised of a television camera. The television sensor 22 provides video signals to a synchronous decoder 24 which provides horizontal blanking, vertical blanking and dither signals. In a typical optical system, the display 16 which, in FIG. 1, was mounted in the control panel of the helicopter 10, is responsive to the video signals produced by the television sensor 22 to reproduce the image in the field of view of the television sensor 22 as determined by the optics 18 by controlling the intensity of an electron beam scanning across a screen comprised of an array of electro-optical devices. The horizontal and vertical blanking signals are provided from the synchronous decoder 24 to the display 16 to synchronize the sweep of the electron beam across the horizontal rows of the electro-optical devices in the display 16 with the video signals representing corresponding points in the field of view of the television sensor 22. Specifically, a pulse in the horizontal blanking signal indicates that the electron beam which scans the array of electro-optical devices in the display 16 is to begin scanning a new horizontal row and, a pulse in the vertical blanking signal indicates that the video signals of the television sensor represent the next field of view and the electron beam of the display 16 is set to rescan the array of electro-optical elements in the display 16. As with most video systems, the display 16 does not scan each row of horizontal elements in the array of the screen for each field of view of the television sensor 22. Rather, the display 16 scans alternate horizontal rows of the electro-optical elements in successive fields of view. For example, if, in the first field of view the display 16 were to scan the horizontal rows one, three, five, etc. on the next field of view the display would scan rows two, four, six, etc. To control this scanning of interleaved horizontal rows on successive fields of the television sensor 22, the synchronous decoder 24 provides a dither signal to the display 16.

Since the field of view of the television sensor 22 as reproduced by the display 16 is controlled by the optics 18, it is apparent that the field of view of the television sensor 22 can be controlled to scan in any particular azimuth or elevation direction by controlling the position of the optic gimbals 20 which support the optics 18. The position of the optic gimbals 20 is controlled by azimuth and elevation error signals which are determined by the volumetric balance video tracker 26 of the present invention in response to the linear video signals of the television sensor 22 and the horizontal blanking, vertical blanking and dither signals of the synchronous decoder 24 as is more specifically hereafter described. The azimuth and elevation error signals provided by the volumetric balance video tracker 26 are provided to a compensating network 28 which stabilize the response of the electro-optical system with respect to the azimuth and elevation error signals of the video tracker 26. The output of the compensating network 28 is provided to azimuth and elevation rate gyros 30 which provide an output to stabilizing and amplifying networks 32 to control the position of the optic gimbals 20. The video system which includes the optics 18, the television sensor 22, the synchronous decoder 24, the display 16, the compensating network 28, and the servo system which includes the rate gyros 30, the stabilizing and amplifying networks 32 and the optic gimbals 20 are well known and understood by those skilled in the art of video trackers and accordingly, are not further described herein. However, the volumetric balance video tracker 26 of the present invention which provides the normalized azimuth and elevation error signals to the compensating network 28 will be hereafter more particularly described.

A time modulator 34 is responsive to the horizontal blanking, vertical blanking and dither signals of the synchronous decoder 24 to provide vertical enable signals (V), vertical early gate signals (V$_E$), vertical late gate signals (V$_L$), horizontal enable signals (H), horizontal early gate signals (H$_E$), and horizontal late gate signals (H$_L$) to a time discriminator 36. A tracking window switch 38, which is operative with the time modulator 34 and the time discriminator 36, is also provided to control the size of the tracking window as is subsequently more fully explained. The time discriminator 36 is responsive to the horizontal and vertical enable signals and to the horizontal and vertical early and late gate signals of the time modulator 34 and to the linear video signal of the television sensor 22 to provide partial azimuth and elevation error signals to an azimuth accumulator 40 and an elevation accumulator 42 in accordance with timing signals provided by a synchronous clock 44. Sample and hold circuits 46 and 48 are responsive to the azimuth and elevation accumulators 40 and 42 respectively to sample and hold azimuth and elevation error signals in response to additional timing signals provided by the synchronous clock 44. A target gain control 50 is responsive to the outputs of the sample and hold circuits 46 and 48 and to the outputs of the azimuth and elevation accumulators 40 and 42 to normalize the gain of the azimuth and elevation error signals with respect to the displacement of the volumetric centroid of the target from the center of the tracking window as hereafter more fully explained in relation to FIGS. 3, 6 and 8. Sample and hold circuits 52 and 54 are responsive to the target gain control 50 to sample and hold the normalized azimuth and elevation error signals in response to control signals of the synchronous clock 44 to provide normalized azimuth and elevation error signals to the compensating network 28.

The basis of operation for the disclosed volumetric balance video tracker 26 is succinctly described in the following equations for the tracking window of FIG. 1A which is defined by the boundaries $x_1$ and $x_2$ in the horizontal dimension and by the boundaries $y_1$ and $y_2$ in the vertical dimension. The analog voltage corresponding to the $x_0$ position of the track window is described by the equation:

$$e(x_o) = \int_{y_1}^{y_2} \int_{x_o}^{x_2} S(x,y)dxdy - \int_{y_1}^{y_2} \int_{x_1}^{x_o} S(x,y)dxdy \quad (1)$$

where:
$x_0 = (x_1 + x_2)/2$,
and $S(x,y)$ is the function of the linear video signals
Similarly, the analog voltage at the $y_0$ location of the tracking window is described by the equation:

$$e(y_o) = \int_{y_o}^{y_2} \int_{x_1}^{x_2} S(x,y)dxdy = \int_{y_1}^{y_o} \int_{x_1}^{x_2} S(x,y)dxdy \quad (2)$$

where:
$y_0 = (y_1 + y_2)/2$

As defined in the above equations, it will be noted that the $x_0$ and $y_0$ positions define the center of the track window whose location within the sensor field of view is determined by values $x_1$ and $x_2$ and by the values of $y_1$ and $y_2$. If the video tracker is designed such that, for a no-error tracking condition, the values $e(x_0)$ and $e(y_0)$ are zero, it is apparent that, for a constant background signal, the disclosed video tracker will track a volumetric centroid of the target defined in the $x$ dimension as the point on the target at which the integration of the video signal over the area of the track window defined by the $y_1$ and $y_2$ dimensions and by the $x_0$ and $x_2$ dimensions equals the integration of the video signal over the area of the track window defined by the $y_1$ and $y_2$ dimensions and by the $x_1$ and $x_0$ dimensions. Similarly, the volumetric centroid of the target is defined in the $y$ direction as the point on the target at which the integral of the portion of the tracking window defined by the $y_0$ and $y_2$ dimensions and by the $x_1$ and $x_2$ dimensions is equal to the integral of the video signal over the area of the track window defined by the $y_1$ and $y_0$ dimensions and by the $x_1$ and $x_2$ dimensions. More specifically stated for the example of the preferred embodiment, it can be said that the $x$ dimension of the volumetric centroid of the target is defined as the point at which the integral of the video signal over the right half of the tracking window is equal to the integral of the video signal over the left half of the track window and the $y$ dimension of the volumetric centroid can be defined as the point at which the integral of the video signal over the top half of the track window equals the integral of the video signal over the bottom half of the track window. Accordingly, the disclosed tracker can be generally described as a volumetric balance video tracker.

Relating the basis of operation of the disclosed video tracker to the block diagram of FIG. 2, the vertical and horizontal early and late gate signals provided by the time modulator 34 in response to the horizontal and vertical blanking signals and the dither signal of the synchronous decoder 24 define the boundaries and the center of the tracking window over which the linear video signals of the television sensor 22 will be integrated. Specifically, the vertical early and late gate signals define the top and bottom half of the track window respectively while the horizontal early and late gate signals define the left and right half of the track window respectively. The time discriminator 36 performs a partial integration of the linear video signals provided by the television sensor 22 in accordance with the limits of integration represented as the horizontal and vertical early and late gates provided by the time modulator 34 for each horizontal line in the sensor field of view. The azimuth and elevation accumulators 40 and 42 complete the integration of the video signals by accumulating the line-by-line outputs of the time discriminator 36 over the field of view of the television sensor 22.

As indicated by the above equations, the volumetric balance video tracker will be operative for both positive and negative contrast targets. That is, the disclosed tracker is operative for targets whose video signals have a high intensity with respect to the background of the television sensor field of view, and is also operative with targets having video signals of low intensity with respect to signals in the television sensor field background.

Figure 4:
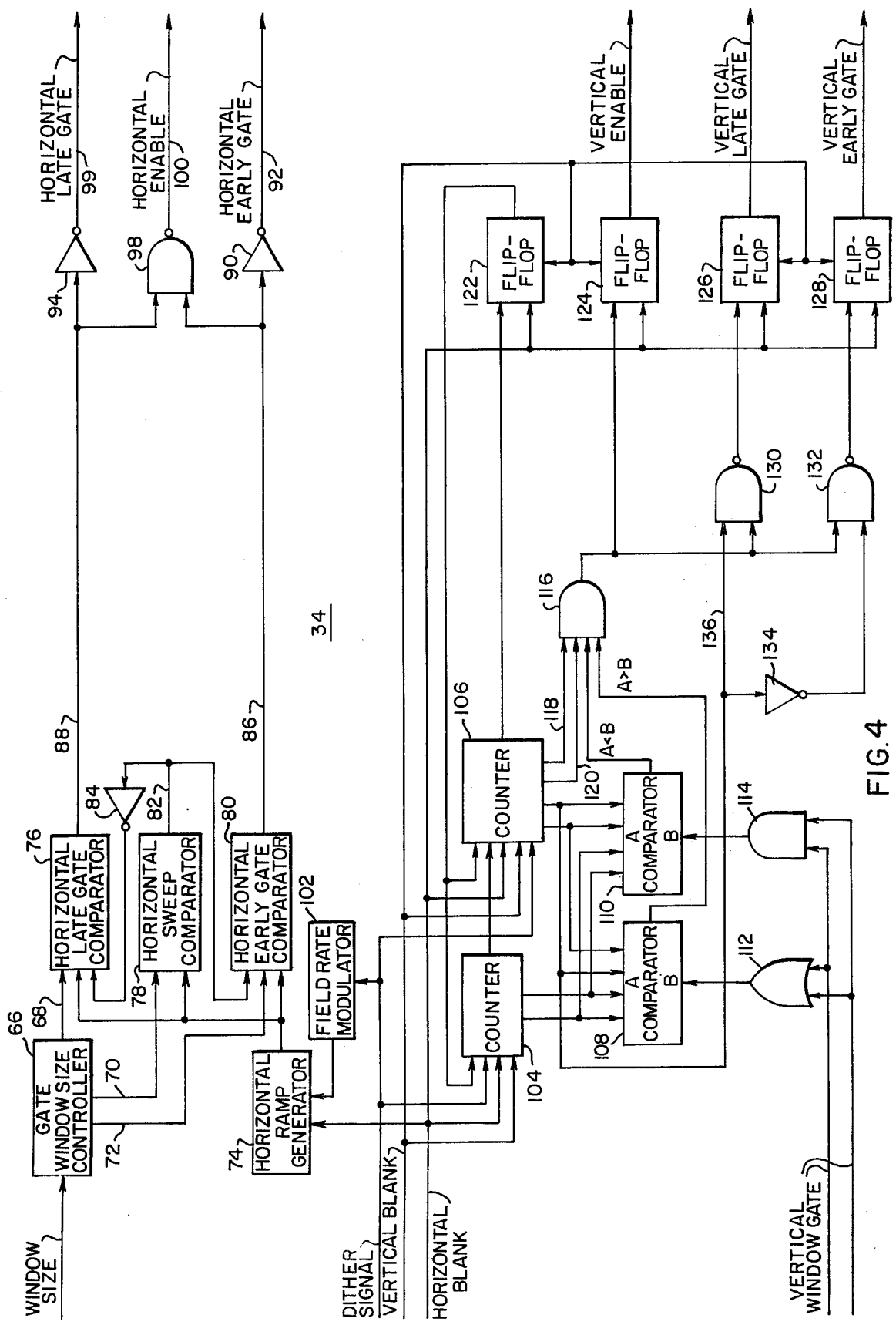
FIG. 4 is a more detailed block diagram of the time modulator shown in FIG. 2.

The tracking window switch 38, which in the preferred embodiment is comprised of a manual pushbutton switch, permits control of the size of the tracking window defined by the vertical and horizontal early and late gate signals of the time modulator 34 as is more particularly explained in relation to FIG. 4. Since the error signals are determined by the integration of the linear video signal of the television sensor 22 over a predetermined portion of the track window, it is apparent that the gain of the error signals is largely dependent upon the size of the track window. Therefore, the track window switch 38 is also operative with the time discriminator 36 which contains a resistor network that controls the gain of the azimuth and elevation error signals in relation to the size of the track window to limit the dynamic range required for the time discriminator 36 and the azimuth and elevation accumulators 40 and 42.

Given equation (1) with $e(x_0)$ equal to zero as an expression of the $x$ dimension of the volumetric centroid of the target, an azimuth error voltage $e(x_0 \Delta x)$ representing the $x$ dimension deviation of the target centroid from the center of the track window can be expressed as:

$$e(x_o \Delta x) = \int_{y_1}^{y_2} \int_{x_o}^{x_2} S(x - \Delta x, y) dx dy - \int_{y_1}^{y_2} \int_{x_1}^{x_o} S(x - \Delta x, y) dx dy \quad (3)$$

where: $\Delta x$ is the $x$ deviation of the target centroid from the center of the track window. Likewise, given equation (2) with $e(y_0)$ equal to zero as an expression of the $y$ dimension of the volumetric centroid of the target, the elevation error voltage $e(y_0, \Delta y)$ corresponding to the $y$ dimension deviation of the target volumetric centroid from the center of the track window can be expressed as:

$$e(y_o \Delta y) = \int_{y_o}^{y_2} \int_{x_1}^{x_2} S(x, y - \Delta y) dx dy - \int_{y_1}^{y_o} \int_{x_1}^{x_2} S(x, y - \Delta y) dx dy \quad (4)$$

where: $\Delta y$ is the $y$ deviation of the target centroid from the center of the track window. By appropriately expanding equations (3) and (4) and by use of the Mean Value Thorem, the $x$ dimension error signal can be rewritten as:

$$\Delta e_x = e(x_0 \Delta x) - e(x_0) = 2 \bar{S}(\beta) \Delta x \quad (5)$$

where:

$$\bar{S}(x) = \int_{y_1}^{y_2} S(x, y) dy, \text{ and } (x_o - \Delta x) \leq \beta \leq x_o$$

Similarly, the $y$ dimension error signal can be rewritten as:

$$\Delta e_y = e(y_0 \Delta y) - e(y_0) = 2 \bar{S}(\delta) \Delta y \quad (6)$$

where:

$$\bar{S}(y) = \int_{x_1}^{x_2} S(x, y) dx, \text{ and } (y_o - \Delta y) \leq \delta \leq y_o$$

For the volumetric balance video tracker it was previously explained that $e(x_0)$ and $e(y_0)$ equal zero. For this condition, equations (5) and (6) may be rewritten as:

$$G_x = \Delta e_x / \Delta x = 2 \bar{S}(\beta) \quad (7)$$

$$G_y = \Delta e_y / \Delta y = 2 \bar{S}(\delta) \quad (8)$$

where $G_x$ and $G_y$ describe the position error gain of the azimuth and elevation error signals respectively. Equations (7) and (8) indicate that the error signal gain, or change in error signal voltage with respect to the displacement of the volumetric centroid of the target from the center of the track window, is dependent upon $S(x,y)$, the function of the video signal of the particular target. That is, the gain of the azimuth and elevation error signals for the volumetric balance video tracker is dependent upon the particular function of the video signals of the target which is being tracked.

As was previously explained, the target gain control 50 in the volumetric balance video tracker of FIG. 2 operates to normalize the azimuth and elevation error signals with respect to the displacement of the volumetric centroid of the target from the center of the track window. It will be further recalled that the video system which is described in FIG. 2 forms an optical image on the display 16 by causing television sensor 22 to raster scan the image during one frame time with two interlaced fields which together comprise a television frame. These television fields are distinguished by the dither signal which is provided to the time modulator 34 of the volumetric balance video tracker 26 from the synchronous decoder 24. The consequence of providing this dither signal to the time modulator 34 is to shift the track window defined by the horizontal and vertical early and late gates of the time modulator 34 by a known amount in the $x$ dimension of the television sensor field and also by a known amount in the $y$ dimension of the television sensor field. Therefore, as described herein, the time discriminator 36 performs a partial integration of the linear video signals within the limits defined by the horizontal early and late gates for a first field of the television sensor 22, and then performs a partial integration over a second television sensor field within the limits defined by a second pair of horizontal early and late gates which are displaced by a known amount with respect to the previous horizontal early and late gate signals. Likewise, the azimuth and elevation accumulators 40 and 42 complete the integration of the time discriminator 36 for the first field by integrating the linear video signals of the television sensor 22 within the limits of the track window defined by the vertical early and late gate signals corresponding to the first television sensor field. Then, the accumulators 40 and 42 complete the integration of the time discriminator 36 over the limits of integration defined by the vertical early and late gates corresponding to the second field of the television sensor which are displaced by a known amount with respect to the first vertical early and late gates. The second track window defined by the second pair of horizontal early and late gates corresponding to the second field of the television sensor 22 is illustrated in the display 16 of FIG. 1A as occurring between the horizontal dimensions $x_1'$ and $x_2'$ and the vertical dimensions $y_1'$ and $y_2'$.

For the known horizontal deviation between the limits of integration defined by the horizontal early and late gate signals of the time modulator 34 for successive fields of the television sensor 22, the gain in the azimuth error signal as a consequence of the known horizontal displacement between the successive fields can be described as:

$$G_x = \frac{e(x_o \Delta x) - e(x_o \Delta x - \alpha)}{\alpha} \quad (9)$$

where:

α equals the known horizontal displacement.

Figure 3:
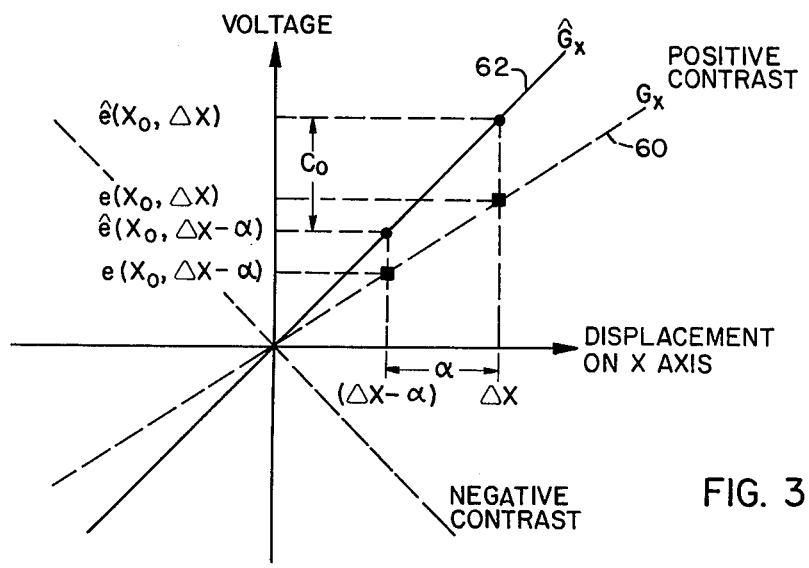
FIG. 3 is a graph of azimuth error signal voltage versus the linear displacement of the target volumetric centroid along the X-axis of the sensor field of view which illustrates the method of the disclosed video tracker in normalizing the gain of the azimuth error signal with respect to displacement along the X-axis.

A graph representing this voltage gain relative to the horizontal displacement α in the sensor field of view is illustrated in FIG. 3. Consistent with the foregoing description, $\Delta x$ represents the displacement of the volumetric centroid of the target with respect to the center of the track window, and as shown in equation (7), the gain of the azimuth error signal ($G_x$) as provided by the azimuth accumulator 40 is dependent on the video signal characteristic of the target. An exemplary gain value ($G_x$) is illustrated in FIG. 3 for a positive contrast of the target with respect to the background of the field by the dashed line 60. FIG. 3 shows that, in accordance with the gain $G_x$, the azimuth error voltage $e(x_0 \Delta x)$ intersects the line 60 at the point $\Delta x$ on the X-axis, and the error voltage $e(x_0 \Delta x - \alpha)$ intersects the line 60 at the point $\Delta x - \alpha$ on the X-axis. However, as is also shown in FIG. 3, for the gain of the error signal to be independent of $S(x,y)$, the signal characteristic of the particular target which is being tracked, a normalized gain ($\hat{G}_x$) illustrated by line 62 would be required. Therefore, in providing a normalized azimuth error signal, the target gain control 50 determines the normalization factor necessary to convert the actual error signal gain $G_x$, illustrated in FIG. 3 as line 60, to a normalized gain value $\hat{G}_x$ represented as line 62.

FIG. 3 illustrates that since the normalized gain $\hat{G}_x$ illustrated as line 62 is a known constant for all targets having positive contrast, and since α, the displacement of the successive fields of the television sensor 22, is constant for the video system, the voltage value $\hat{e}(x_0 \Delta x) - \hat{e}(x_0 \Delta x - \alpha)$ is also a constant $C_0$. If the difference between the error signal $e(x_0 \Delta x)$, corresponding to one field of the television sensor 22, and the error signal $e(x_0 \Delta x - \alpha)$, corresponding to a second field of the television sensor 22, is multiplied by an azimuth normalization factor ($M_x$) such that the product is equal to the constant $C_0$, it can be shown that this multiplier $M_x$ is equal to the ratio of the normalized gain to the actual gain ($\hat{G}_x/G_x$). This can be expressed mathematically as:

$$M_x = \hat{G}_x/G_x \quad (10)$$

where:

$M_x [e(x_0 \Delta x) - e(x_0 \Delta x - \alpha)] = C_0$

Therefore, the azimuth error signal can be normalized by multiplying $e(x_0 \Delta x)$, the error signal obtained from the azimuth accumulator 40, by the multiplier $M_x$ for which $e(x_0 \Delta x) - e(x_0 \Delta x - \alpha)$, the difference between the azimuth error signals for successive fields of the television sensor 22 substantially equal to a constant $C_0$ which equals $\hat{e}(x_0 \Delta x) - \hat{e}(x_0 \Delta x - \alpha)$, the difference between normalized azimuth error signals corresponding to a known horizontal displacement between the track windows of successive fields of the television sensor 22. This can be expressed as:

$$\hat{e}(x_0 \Delta x) = M_x [e(x_0 \Delta x)] \quad (11)$$

Figure 6:
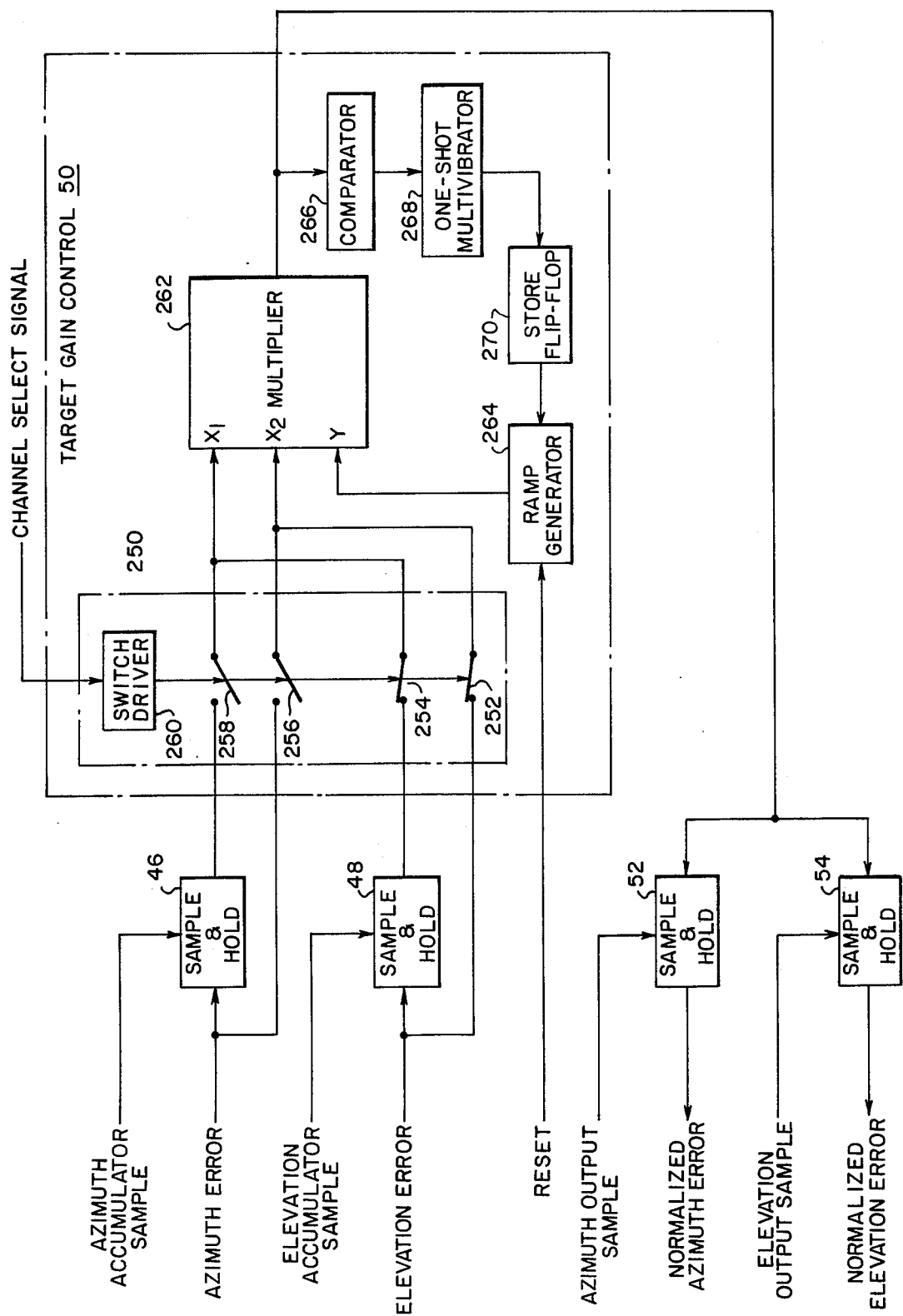
FIG. 6 is a more detailed block diagram of the target gain control shown in the video tracker of FIG. 2.

As more particularly explained in relation to FIGS. 6 and 8, the target gain control 50 accomplishes this normalization process by multiplying the difference in the azimuth error signals on successive fields of the television sensor 22 $[e(x_0 \Delta x) - e(x_0 \Delta x - \alpha)]$ by an increasing value of $M_x$ until the product is substantially equal to the constant value $C_0$ which is the difference between the azimuth error signals on successive fields of the television sensor 22 corresponding to a normalized error gain $[\hat{e}(x_0 \Delta x) - \hat{e}(x_0 \Delta x - \alpha)]$. The sample and hold network 46 is operative to save the azimuth error signal from the previous field of the television sensor 22 so that the difference between azimuth error signals for successive fields of the television sensor 22 can be obtained to determine the normalization multiplier $M_x$. The normalized azimuth error signal $\hat{e}(x_0 \Delta x)$ is then obtained by multiplying $e(x_0 \Delta x)$, the azimuth error signal provided by the azimuth accumulator 40, by this final value for the multiplier $M_x$. The azimuth error signals corresponding to one of the successive fields are set equal to zero so that the other of the azimuth error signals can be multiplied by the normalization factor $M_x$ to obtain the normalized azimuth error signal output. As is apparent to those skilled in the art, the same analysis for normalizing the azimuth error signals for negative contrast targets applies except that the voltage values would be of correspondingly inverse signs.

It will also be recognized that the analysis analogously applies to normalize the elevation error signals $e(y_0 \Delta y)$ provided by the elevation accumulator 42. The sample and hold network 48 is provided to store the elevation error signal $e(y_0 \Delta y)$ so that the elevation normalization factor $M_y$ can be obtained by multiplying the difference of elevation error signals which occur on successive fields of the television sensor 22 $[e(y_0 \Delta y) - e(y_0 \Delta y - \alpha)]$ to yield the predetermined constant value $C_0$. The elevation error signals corresponding to one of the successive fields are then set equal to zero so that the other of the elevation error signals can be multiplied by the normalization factor $M_y$ to obtain the normalized elevation error signal outputs. The normalized azimuth and elevation error signal outputs are stored in the sample and hold circuits 52 and 54, respectively in response to sample signals provided by the synchronous clock 44.

The time modulator 34 of FIG. 2 which provides the horizontal and vertical early and late gate signals to define the integration limits of the time discriminator 36 in response to horizontal and vertical blanking signals is further described in FIG. 4. The time modulator 34 is comprised of a horizontal signal portion that includes a gate window size controller 66 which is a resistance network that is responsive to the control signals of the tracking window switch 38 (FIG. 2) to provide voltage output signals on lines 68, 70 and 72. The voltage on line 72 represents one horizontal boundary of the tracking window and the voltage on line 68 represents the other horizontal boundary of the tracking window. The voltage on line 70 is a constant voltage which represents the center of the tracking window and, since it is located at the center of the window, is independent of the tracking window size as determined by the tracking window switch 38. The time modulator 34 also includes a horizontal ramp generator 74 which is responsive to the horizontal blanking signals of the synchronous decoder 24 to provide a ramp output signal with a frequency corresponding to the frequency of the pulses in the horizontal blanking signal.

The time modulator 34 also includes a horizontal late gate comparator 76, a horizontal sweep comparator 78 and a horizontal early gate comparator 80. The horizontal sweep comparator 78 is responsive to the constant voltage value on line 70 corresponding to the center of the track window and is also responsive to the ramp output signal of the horizontal ramp generator 74. When the value of the ramp signal provided by the horizontal ramp generator 74 is less than the constant voltage provided on line 70, the horizontal sweep comparator 78 provides an enable signal on line 82 to the horizontal early gate comparator 80 and also to the inverter 84 which provides the complement of the enable signal on line 82 to the horizontal late gate comparator 76. Therefore, when the ramp signal output of the horizontal ramp generator 74 is less than the voltage on line 70, indicating that the horizontal sweep of the video signal has not passed the center of the track window, an enable signal is provided by the horizontal sweep comparator 78 to the horizontal early gate comparator 80 on line 82. After the voltage of the horizontal ramp generator 74 exceeds the voltage provided on line 70, the sweep of the video signal has passed the center of the track window and the horizontal sweep comparator 82 no longer provides an enable signal to the horizontal early gate comparator 80. However, the inverter 84, which had previously provided no enable signal to the horizontal late gate comparator 76 in response to the enable signal on line 82, provides an enable signal to the horizontal late gate comparator 76 in response to no enable signal on line 82, thereby enabling the comparator 76 for the second half of the track window.

The horizontal early gate comparator 80 is also responsive to the ramp signal of the horizontal ramp generator 74 and compares this ramp signal with the voltage value on line 72 which represents the first boundary of the tracking window. When the horizontal ramp output signal of the generator 74 exceeds the voltage value on line 72 and the enable signal from the comparator 78 is present, an output signal is provided on line 86. The horizontal late gate comparator 76 is also responsive to the ramp signal of the ramp generator 74 and compares this signal with the volatage on line 68 of the gate window size controller 66. When the ramp output signal of the ramp generator 74 is less than the voltage on line 68 and an enable signal is provided from the inverter 84, the horizontal late gate comparator 76 provides an output signal on line 88. From the previous description of the enable signal provided by the horizontal sweep comparator 78, it is apparent that the output signal provided by the early gate comparator 80 will be present only during the first half of the track window and that the horizontal late gate comparator output signal will be present only during the second half of the track window. An inverter 90 is responsive to the output of the horizontal early gate comparator 80 to provide the horizontal early gate signal on line 92 and an inverter 94 is responsive to the output of the horizontal late gate comparator 76 to provide the horizontal late gate on line 99. A NAND gate 98 is responsive to both the outputs of the horizontal early gate comparator 80 and the horizontal late gate comparator 76 to provide a horizontal gate enable signal on line 100. The time modulator 34 further includes a field rate modulator 102 which is responsive to the dither signal of the synchronous decoder 24 to slightly delay the start of the ramp output signal of the horizontal ramp generator 74. The horizontal gate signals are thereby shifted in time and, therefore, in position between successive fields of the television sensor 22.

In the preferred embodiment, the time modulator also comprises a vertical early and late gate portion that includes a pair of cascaded counters 104 and 106 which are responsive to the vertical and horizontal blanking signals of the synchronous decoder 24. The vertical blanking signal sets the counters 104 and 106 to initial conditions after which they begin counting in response to pulses in the horizontal blanking signal. The output of the counters 104 and 106 is provided to the A input of two comparators 108 and 110. The B input to the comparator 108 is provided from an OR gate 112 and the input to the B terminal of the comparator 110 is provided by an AND gate 114. The OR gate 112 and the AND gate 114 are responsive to the vertical window gate size signals provided from the tracking window switch 38. The output of the OR gate 112 represents the upper boundary of the tracking window while the output of the AND gate 114 represents the lower boundary of the tracking window. The comparator 108 provides an output to an AND gate 116 whenever the input to the A terminal provided by the counters 106 and 108 exceeds the input to the B terminal provided by the OR gate 112. Conversely, the comparator 110 provides an output to the AND gate 116 whenever the input to the B terminal by the AND gate 114 exceeds the input to the A terminal provided by the counters 104 and 106. The AND gate 116 is also responsive to the two most significant bits of the counter 106 which are provided on lines 118 and 120. The horizontal blank signal is also provided to the clock inputs of the D type flip-flops 122, 124, 126 and 128. The output of the AND gate 116 is provided to the D terminal of the flip-flop 124 and to NAND gates 130 and 132. The third most significant bit of the counter 106 is provided to the second input of the NAND gate 130 and is also provided to an inverter 134 whose output is conducted to the NAND gate 132. The outputs of the NAND gates 130 and 132 are provided to the D terminals of the flip-flops 126 and 128. The vertical blanking signal is provided to the reset terminals of the D type flip-flops 122 and 124 and is provided to preset terminals of the D type flip-flops 126 and 128.

In the operation of the vertical portion of the time modulator 34, the counters 104 and 106 are set to zero by the occurrence of a pulse in the vertical blanking signal. The counters are clocked by the pulses of the horizontal blanking signal and, therefore, count up the number of horizontal lines which are scanned on the particular field of the television sensor 22 corresponding to the last pulse in the vertical blanking signal. When the counters 104 and 106 have counted enough lines to fill the two most significant bits in the counter 106, and the comparator 108 indicates that the value of the counters exceeds the value of the top boundary of the track window as established by the OR gate 112 while the comparator 110 indicates that the counters have not exceeded the bottom boundary of the horizontal track window as established by the AND gate 114, the AND gate 116 will provide an output signal to the D terminal of the flip-flop 124 causing the flip-flop 124 to provide a vertical gate enable signal in response to the horizontal blanking signal provided to the clock input. After the counter 106 provides a signal corresponding to its second most significant bit on line 120 but before a signal corresponding to the third most significant bit is provided on line 136, no signal is provided on line 136 to the NAND gate 130 so that the flip-flop 126 will provide no vertical late gate signals. However, the inverter 134 inverts this no signal condition of line 136 and, when an output signal is provided by the AND gate 116, causes the NAND gate 132 to provide a signal to the D terminal of the flip-flop 128 such that the flip-flop 128 provides vertical early gate signals in response to the horizontal blanking signal provided to its clock terminal. The third most significant bit of the counter 106 provides an output transition on the line 136 marks the vertical center of the track window. When the third most significant bit of the counter 106 changes state causing a signal to be provided on line 136, the output of the inverter 134 is also inverted so that the NAND gate 132 no longer enables the flip-flop 128 to produce a vertical early gate signal in response to the clock signals of the horizontal blanking signal. However, the change in state of the third most significant bit causes the value on line 136 to cooperate with the output of the AND gate 116 such that the NAND gate 130 enables the flip-flop 126 to begin providing a vertical late gate signal in response to the clock signals provided by the horizontal blanking signal. The flip-flop 126 provides a vertical late gate in response to the clock pulses of the horizontal blanking signal until the comparator 110 determines that the value provided to its A input from the counters 104 and 106 is no longer less than the value provided to its B input from the AND gate 114 to close the pulse of the vertical late gate signal.

At the completion of the timing cycle of the counters 104 and 106 when all of the bits of the counters have a value, the next pulse in the horizontal blanking signal causes the counter 106 to provide an output signal to the flip-flop 122 which causes the flip-flop 122 to provide an output signal that resets the counters 104 and 106 to their initial conditions. This output signal is maintained by the flip-flop 122 to hold the counters 104 and 106 to their initial value despite pulses in the horizontal blank signal until the flip-flops 122 and 124 are reset by the pulse of the vertical blanking signal which also presets the flip-flops 126 and 128. The vertical portion of the time modulator 34 is the ready to produce vertical early and late gate signals in response to the horizontal blanking signals of the next field.

Similar to the mechanism for controlling the horizontal window size, the values provided to the OR gate 112 and to the AND gate 114 by the tracking window switch 38 will determine the values to which the output signal of the counters 104 and 106 will be compared and, consequently, will determine the upper and lower edge of the track window respectively. Also, analogous to the horizontal portion of the time modulator 34, the vertical portion of the time modulator 34 is responsive to the dither signal of the synchronous decoder 24 to offset the track window of one field of the video signal by a predetermined value in the vertical direction in response to the dither signal. Specifically, this is accomplished in the vertical portion of the time modulator by changing the initial value of the counters 104 and 106 so that the values provided by the counters 104 and 106 to the A terminals of the comparators 108 and 110 cause a signal to be produced by the AND gate 116 in response to a fewer number of pulses in the horizontal blanking signal thereby shifting the center of the track window upward by a number of horizontal lines equal to the change in the initial conditions of the counters 104 and 106.

Figure 7:
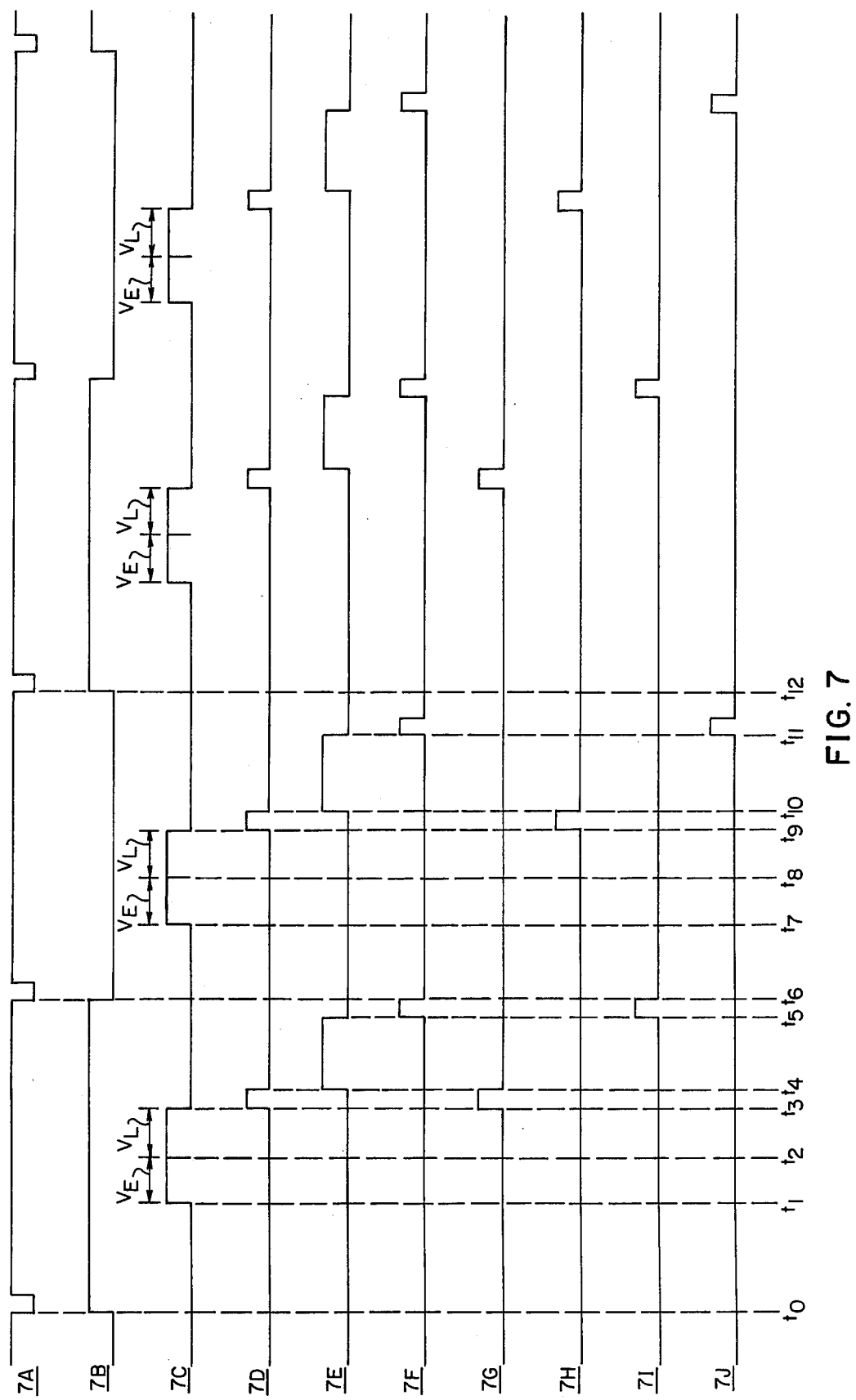
FIG. 7 shows various waveforms illustrating the operation of the volumetric balance tracker shown in FIG. 2 and further described in FIGS. 4 through 6.

The vertical blanking signal which is provided as an input signal to the volumetric balance video tracker 26 by the synchronous decoder 24 is illustrated as waveform 7A of FIG. 7. The vertical early and late gate signals provided by the flip-flops 128 and 126, respectively are illustrated as waveform 7C of FIG. 7. The horizontal blanking signal and the horizontal early and late gate signals would appear substantially similar to the vertical blanking signal and the vertical early and late gate signals of waveforms 7A and 7C respectively except that the horizontal blanking signal and the horizontal early and late gate signals would have a time base which would give them a frequency several orders of magnitude higher than the vertical signals which are illustrated. This difference in time base between the horizontal and vertical early and late gate signals is the basic reason for the digital implementation of the vertical portion of the time modulator 34 since digital circuitry has proven to be significantly more accurate than its analog counterpart.

Figure 5:
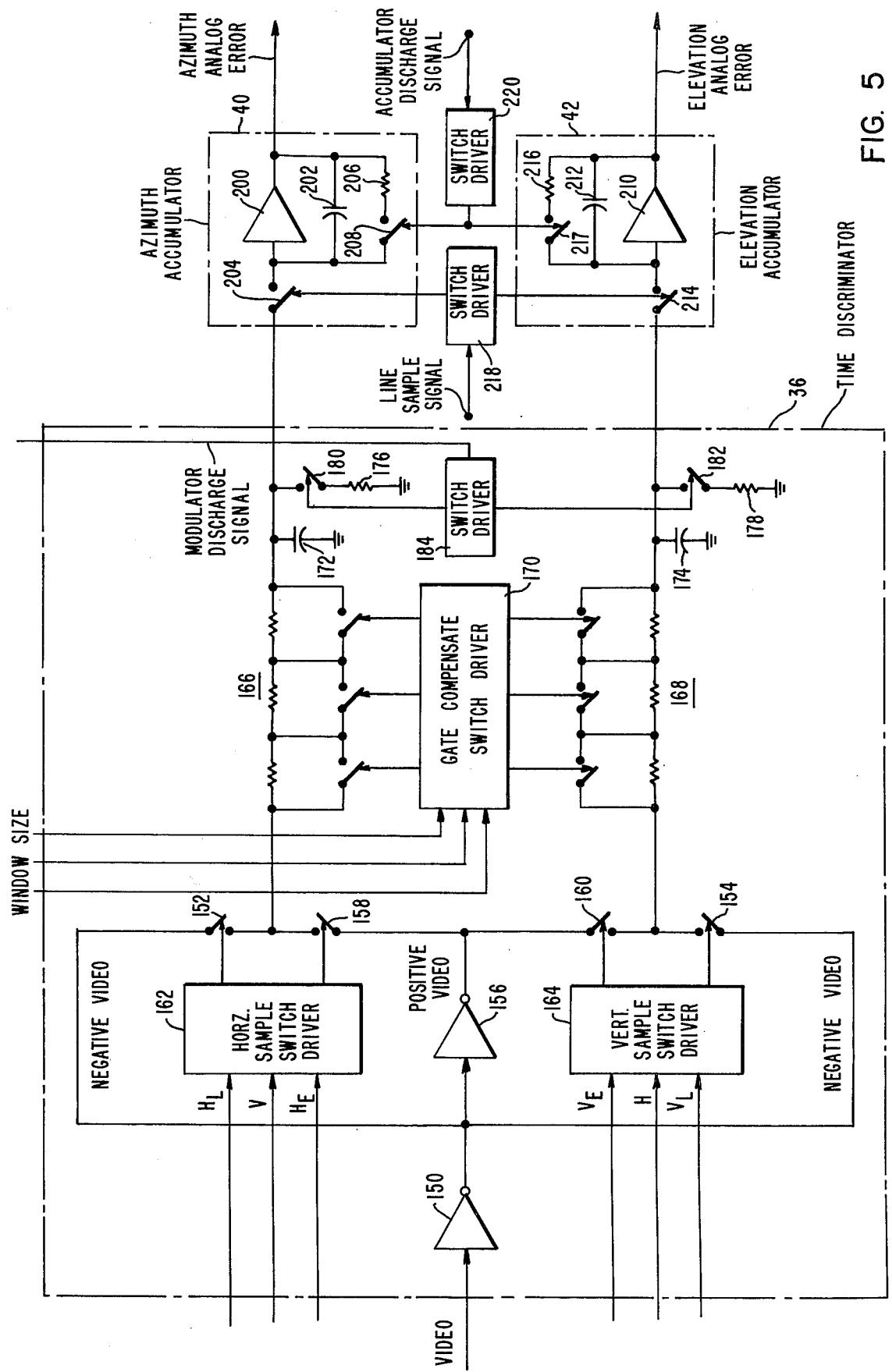
FIG. 5 is a more detailed diagram of the time discriminator and the azimuth and elevation accumulators shown in the block diagram of FIG. 2.

The time discriminator and window gain control 36 which performs the partial integration of the linear video signals provided by the television sensor 22 over the limits of integration established by the horizontal and vertical early and late gate signals from the time modulator 34 is described more particularly in relation to FIG. 5. In the time discriminator 36 of FIG. 5, the linear video signals of the television sensor 22 are provided to an inverter 150 which inverts and amplifies the linear video signals to provide negative video signals at its output. These negative video signals are provided to switches 152 and 154 and are also provided to a unity gain inverter 156 which provides positive video signals to switches 158 and 160. The switches 152 and 158 are controlled by the horizontal sample switch driver 162 in response to the horizontal early and late gate signals and in response to the vertical enable signal. The switches 160 and 154 are controlled by the vertical sample switch driver 164 in response to the vertical early and late gate signals and in response to the horizontal enable signal. The negative video signals of the inverter 150 are selectively provided through the switches 152 and 154 to resistor ladder networks 166 and 168, respectively. The positive video of the inverter 156 is selectively provided through the switches 158 and 160 to the resistor ladder networks 166 and 168. The steps in the resistor ladder networks 166 and 168 are controlled by the gate compensate switch driver 170 which is responsive to the track window input signals provided by the tracking window switch 38 (FIG. 2). The output signals of the resistor ladder networks 166 and 168 are stored in the integrating capacitors 172 and 174 respectively. Connected in parallel with the integrating capacitors 172 and 174 are discharge resistors 176 and 178 respectively. The discharge resistors 176 and 178 are selectively connected to discharge the voltage on the integrating capacitors 172 and 174 by the switches 180 and 182 respectively which are both controlled by a switch driver 184 in response to a modulator discharge signal from the synchronous clock 44 (FIG. 2).

In the operation of the time discriminator 36 disclosed in FIG. 5, the linear video signals provided by the television sensor 22 are inverted by the inverter 150 and provided as negative video signals to the input terminals of the switches 152 and 154. Also, the negative video signals are again inverted by the unity gain inverter 156 to provide positive video signals to the input terminals of the switches 158 and 160. The switches 152 and 158 are selectively controlled by the horizontal sample switch driver 162 in response to horizontal early and late gate signals and in response to the vertical enable signal. Specifically, when the horizontal early gate signal and the vertical enable signal are present, the switch 158 is closed and the positive video signal is provided to the ladder resistance network 166. For the example of the video signals as presented in the display of FIG. 1A, the switch 158 would be closed to conduct video signals corresponding to the area of $x_1$ to $x_0$ in the horizontal dimension and $y_1$ to $y_2$ in the vertical dimension for the track window corresponding to the first field. For the second field, the switch 158 would be closed to conduct positive video signals to the resistor network 166 for video signals corresponding to the area of $x_1'$ to $x_0'$ in the horizontal dimension and $y_1'$ to $y_2'$ in the vertical dimension. During these times, the switch 152 would remain open so that no negative video signals were provided to the resistor network 166. However, during the presence of the horizontal late gate signal and the vertical enable signal provided by the time modulator 34, the horizontal sample switch driver would open the switch 158 to prevent further positive video signals from being conducted to the resistance network 166 and would close the switch 152 to conduct the negative video signals of the inverter 150 to the resistance network 166. Referring again to the video signals represented in the display 16 of FIG. 1A, the switch 152 would be closed for video input signals corresponding to the area from $x_0$ to $x_2$ in the horizontal dimension and from $y_1$ to $y_2$ in the vertical dimension for the track window corresponding to the first field. Similarly, the switch 152 would be closed for linear video signals corresponding to the area of $x_0'$ to $x_2'$ in the horizontal dimension and from $y_1'$ to $y_2'$ in the vertical dimension for the track window corresponding to the second field.

In a manner analogous to that described for the horizontal sample switch driver 162, the vertical sample switch driver 164 would close the switch 160 in response to the presence of a vertical early gate signal and a horizontal enable signal to provide positive video signals to the latter resistance network 168. Referring again to the linear video signals represented in the display 16 of FIG. 1A, the switch 160 would be closed to conduct linear video signals corresponding to the area of $y_1$ to $y_0$ in the vertical dimension and $x_1$ and $x_2$ in the horizontal dimension for the track window corresponding to the first field and would conduct signals represented by the area of $y_1'$ to $y_0'$ in the vertical dimension and $x_1'$ to $x_2'$ in the horizontal dimension for the track window corresponding to the second field. Finally, the switch 160 would be opened and the switch 154 would be closed by the vertical sample switch driver 164 in response to the vertical late gate signals and the horizontal enable signals of the time modulator 34. The closing of the switch 154 would provide the negative video signals of the inverter 150 to the ladder resistance network 168. These linear video signals would correspond to the area between $y_0$ and $y_2$ in the vertical dimension and $x_1$ and $x_2$ in the horizontal dimension for the track window corresponding to the first field represented on the video display in FIG. 1A. Also, the switch 154 would be closed to conduct video signals corresponding to the area of $y_0'$ to $y_2'$ in the vertical dimension and $x_1'$ to $x_2'$ in the horizontal dimension for the track window corresponding to the second field of the television sensor 22.

As is known to those skilled in the art, the ladder resistance network, whose impedance is controlled by the gate compensate switch driver 170 cooperating with the switches of the resistance networks 166 and 168, will cause a voltage drop in the linear video signals provided through the switches 152 and 158 and the switches 160 and 154 in proportion to the number of resistances which are included in the current path. The gate compensate switch driver 170 is controlled in accordance with the input signals provided from the tracking window switch 38 such that the tracking window switch 38 determines the number of switches in the ladder resistance network that are closed and, therefore, the voltage drop which is experienced by the video signals as they pass through the resistance networks 166 and 168. The resistance networks 166 and 168 therefore control the gain of the linear video signals conducted by the switches 152, 158, 160 and 154 in accordance with the size of the tracking window. As was explained previously, this gain compensation for the size of the tracking window is necessary to limit the dynamic range required of the integrating components in the video tracker 26 since the error signal gain for a given target will depend upon the size of the tracking window. Specifically, for the smallest tracking window, all the resistances of the ladder networks 166 and 168 are shorted out by closing the switches. For the largest tracking window, all of the switches remain open so that the maximum voltage drop across the ladder networks 166 and 168 will occur. Tracking windows of intermediate size will control the gate compensate switch driver 170 to provide intermediate values of voltage loss across the resistance networks by selectively closing one or more, but less than all of the switches.

In accordance with the previous description of the positive and negative video signals as conducted by the switches 152 and 158 and by the switches 160 and 154, the integrating capacitors 172 and 174 will be charged by the video signals to perform a partial integration of the video signals over a predetermined area of the track window in accordance with the integration of the $x$ variable in the equations (1) and (2) for linear signals of both positive and negative contrast.

Since the integrating capacitors 172 and 174 perform only a partial integration of the linear video signals, specifically, the integration of the video signals over the horizontal dimension, the azimuth and elevation accumulators 40 and 42, respectively are provided to complete the double integration of the video input signals over the appropriate vertical limits of integration as determined by the vertical early and late gate signals and the vertical enable signal. The azimuth accumulator 40 is a well known device comprised of an amplifier 200, an integrating capacitor 202, a sampling switch 204, a discharge resistor 206 and a discharge switch 208. Similarly, the elevation accumulator 42 is comprised of an amplifier 210, an integrating capacitor 212, a sampling switch 214, a discharge resistor 216 and a discharge switch 217. In the operation of the azimuth and elevation accumulators 40 and 42, at the end of each horizontal sweep of the video signal, the synchronous clock 44 provides a line sample timing signal to a switch driver 218 which controls the position of the switches 204 and 214. The application of the line sample signal to the switch driver 218 closes the switches 204 and 214 and provides the voltage charge on the integrating capacitors 172 and 174 to the inputs of the operational amplifiers 200 and 210, respectively. The imbalance on the operational amplifiers 200 and 210 causes the output signal of the amplifiers to increase until a balance condition across the capacitors 202 and 212 is restored. After the line sample signal from the synchronous clock 44 has caused the switch driver 218 to close the switches 204 and 214 causing the accumulators 40 and 42 to add the voltages across the integrating capacitors 172 and 174 to their output voltage level, the line sample signal is removed and the switches 204 and 214 reopen. To return the integrating capacitors 172 and 174 to initial conditions to perform the partial integration of the next horizontal line of video signals over the limits of the tracking window defined by the horizontal and vertical early and late gate signals and the horizontal and vertical enable signals, the voltage stored on the integrating capacitors 172 and 174 is discharged through the resistors 176 and 178 by closing the switches 180 and 182 respectively. The switches 180 and 182 are closed in response to a modulator discharge signal provided by the synchronous clock 44 to the switch driver 184 at the point corresponding to each new horizontal line of video signals. When this next line of video signals is integrated over the limits of the tracking window by the integrators 172 and 174, the switches 204 and 214 are again closed by applying the line sample signal to the switch driver 218 to cause the azimuth and elevation accumulators 40 and 42 to add these voltages to their output signals. The switches 204 and 214 are then opened and the discharge switches 180 and 182 are closed to reset the integrating capacitors 172 and 174 to their initial conditions. This process continues until all of the video signals representing a field of the television sensor 22 have been provided to the time discriminator 36. At the end of this period, which is marked by a pulse in the vertical blank signal, video signals representing the next field are applied to the inverter 150 so that, by the time the vertical blanking signal is received, the azimuth and elevation accumulators 40 and 42 have performed the second part of the double integration for the y variable described in equations (1) and (2) by accumulating all of the horizontal dimension error signals which were within the vertical limits of integration of the tracking window. The azimuth and elevation accumulators 40 and 42 are then reset to their initial condition by closing the reset switches 208 and 217, respectively to cause the capacitors 202 and 212 to discharge through the discharge resistors 206 and 216 respectively. The switches 208 and 217 are closed by applying the accumulator discharge signal of the synchronous clock 44 to a switch driver 220. The line sample signal provided to the switch driver 218 to cause the azimuth and elevation accumulators 40 and 42 to sample the incremental value of the partial integral determined by the integrating capacitors 172 and 174, and the switch driver 184 which is responsive to the modulator discharge signal of the synchronous clock 44 to discharge the integrating capacitors 172 and 174 were provided as a single timing signal. This was because the sampling and discharge functions occurred simultaneously for both the azimuth and elevation accumulators 40 and 42 and the integrating capacitors 172 and 174. Likewise, the discharge of the azimuth and elevation accumulators 40 and 42 is also simultaneous so that a single accumulator discharge signal is provided from the synchronous clock 44 to a switch driver 220 to control both the switch 208 and the switch 217.

As previously described in relation to equations (7) and (8), the gain of the horizontal and vertical error signals provided by the azimuth and elevation accumulators 40 and 42 are dependent on the video signal characteristic of the target which is being tracked. Therefore, the gain of the azimuth and elevation error signals with respect to the displacement of the volumetric centroid of the target from the center of the track window varies from target-to-target. However, as was also described in relation to FIG. 2 and as was illustrated in FIG. 3, the present invention provides a means for normalizing the gain of the azimuth and elevation error signals with respect to a suitable measurement parameter. Specifically, this measurement parameter is the angular deviation of the volumetric centroid of the target from the center of the track window which can also be expressed as the distance between the volumetric centroid of the target and the center of the track window. As was previously explained in relation to FIGS. 2 and 3, this normalization process is accomplished by the target gain control 50 which determines azimuth and elevation normalizing factors from the gain of azimuth and elevation and error signals in successive fields of the television sensor 22 and utilizes this normalizing factor to normalize the azimuth and elevation error signals provided by the azimuth and elevation accumulators 40 and 42. This normalization provides a video tracker having azimuth and elevation error signals of normalized gain despite variations in the characteristic video signals among various targets as is further described in relation to FIG. 6.

FIG. 6 shows that the target gain control 50 includes a channel select switch 250 which includes the switches 252, 254, 256, and 258 that are controlled by a switch driver 260 in response to a channel select signal provided by the synchronous clock 44. The channel select signal is provided by the synchronous clock 44 in response to the dither signal of the synchronous decoder 24. The azimuth error signal provided by the azimuth error accumulator 40 is provided to the sample and hold network 46 and is also provided to the input terminal of switch 256. The elevation error signal provided by the elevation accumulator 42 is provided to the sample and hold network 48, and is also provided to the input terminal of the switch 252. The sample and hold circuits 46 and 48 are also responsive to azimuth and elevation accumulator sample signals provided by the synchronous clock 44. In response to these accumulator sample signals, the sample and hold circuits 46 and 48 sample and hold the azimuth and elevation error signals of the azimuth and elevation accumulators 40 and 42. The sample and hold circuits 46 and 48 provide these sampled signals to the input terminals of the switches 258 and 254, respectively. The output terminals of the switches 258 and 254 are connected to the $x_1$ input terminal of a multiplier 262 and the output terminals of the switches 256 and 252 are provided to an $x_2$ input of the multiplier 262. The multiplier 262 also includes a $y$ input terminal which is responsive to the output signal of a ramp generator 264. The multiplier 262 determines the product of the value applied to the $y$ input terminal times the difference of the values applied to the $x_1$ and $x_2$ input terminals. The multiplier 262 can be comprised of any suitable device which, in the example of the preferred embodiment, is an AD532 which is manufactured by Analog Devices Company. The output of the multiplier 262 is provided to a comparator 266 which compares the multiplier output with a predetermined value $C_0$ that is substantially equal to the difference between the normalized error signals which would occur for the tracking windows of successive fields of the television sensor 22 where the tracking windows are offset with respect to each other by a known displacement. As was previously described in relation to FIGS.

2 and 4, the time modulator 34 of the present invention provides track windows in successive fields of the television sensor 22 which are offset by a known displacement in both the horizontal and vertical dimensions in response to the dither signal of the synchronous decoder 24. This offset in the track window for successive fields of the television 22 is a known constant that is established in the design of the time modulator 34. Furthermore, the deviation of the relative positions of the successive track windows is substantially the same in both the vertical and horizontal directions, so that the constant value $C_0$ is also substantially the same for determining both the azimuth normalization factor $M_x$ and the elevation normalization factor $M_y$.

The output of the comparator 266 is provided to a one shot multivibrator 268 which provides an output pulse to a store flip-flop 270. The output of the store flip-flop 270 is provided to the ramp generator 264 to cause the output ramp signal of the ramp generator 264 to maintain the value of the output ramp signal at the time the signal from the store flip-flop 270 was applied. The ramp generator 264 is also responsive to a reset signal provided by the synchronous clock 44 in response to the vertical blanking signal of the synchronous decoder 24. The output of the multiplier 262 is also provided to the sample and hold circuits 52 and 54 which sample the normalized azimuth and elevation error signals respectively in response to azimuth and elevation output sample control signals provided by the synchronous clock 44.

The operation of the sample and hold circuits 46 and 48, the target gain control circuit 50, and the sample and hold circuits 52 and 54 is described in relation to the waveforms of FIGS. 7 and 8. As was previously described, the vertical blanking signal provided by the synchronous decoder 24 is illustrated by the waveform 7A of FIG. 7. The channel select signal provided by the synchronous clock 44 to the target gain control 50 in response to the dither signal is described in waveform 7B. The vertical early and late gates provided by the time modulator 34 in response to the horizontal and vertical blanking signals and in response to the dither signal of the synchronous decoder 24 is illustrated as waveform 7C. Waveform 7B shows that the field select signal is alternately high and low in response to the pulses in the dither signal of the synchronous decoder 24. Waveform 7C shows that the vertical early and late gates provided by the time modulator 34 occur at predetermined times with respect to the vertical blanking and channel select waveforms. Specifically, the vertical early gate signal is provided as a pulse between times $t_1$ and $t_2$ while the vertical late gate signal is provided as a pulse between times $t_2$ and $t_3$ for the field corresponding to the first pulse in the vertical blanking signal. The waveforms 7B and 7C also show a vertical early gate signal corresponding to the second field of the television sensor 22 between times $t_7$ and $t_8$ and a vertical late gate signal corresponding to the second field of the television sensor between times $t_8$ and $t_9$. Since the channel select signal of waveform 7B acquires a high or low state in response to alternate pulses in the dither signal, and since the television sensor 22 provides a video signal comprised of first and second successive fields that are interleaved to form a single frame of the image, the high state of the channel select signal indicates a first field of the video signal and a low state of the channel select signal indicates a second field of the video signal. As was previously described, and as is illustrated in waveform 7C, the vertical early and late gates corresponding to the second field for which the channel select signal of waveform 7B is in a low state are of the same size as the vertical early and late gate signals corresponding to the first field for which the channel select signal is in a high state. This is illustrated in FIG. 7 in that the time $t_2 - t_1$ which represents the vertical early gate corresponding to the first field equals the time $t_8 - t_7$ which is the time of the vertical early gate corresponding to the second field. Likewise, the time $t_3 - t_2$ which is the time of the vertical late gate corresponding to the first field is equal to the time $t_9 - t_8$ which is the vertical late gate corresponding to the second field. However, as was also previously described, the vertical early and late gates occurring at times $t_7$ to $t_9$ which correspond to the second field are different from the vertical early and late gates which occur at times $t_1$ to $t_3$ which correspond to the first field in that the timing of the vertical early and late gates with respect to the pulse in the vertical blanking signal that marks the beginning of the second field is different than the timing of the vertical early and late gates from the pulse in the vertical blanking signal that marks the beginning of the first field. In the waveforms of FIG. 7, this is illustrated in that the time $t_7 - t_6$ between the vertical early and late gates and the pulse of the vertical blanking signal for the beginning of the second field is shorter than the time $t_1 - t_0$ between the vertical early and late gates and the pulse of the vertical blanking signal marking the beginning of the first field.

As was previously described, the horizontal blanking signal would appear substantially similar to the vertical blanking signal of the waveform 7A and the horizontal early and late gate signals would appear substantially similar to the vertical early and late gate signals of the waveform 7C with the exception that the time base of the horizontal blanking signal and the horizontal early and late gate signals would be orders of magnitude shorter than the time base of the corresponding vertical signals. Otherwise, the relation of the horizontal early and late gate signals with respect to horizontal blanking signal is analogous to the relation of the vertical early and late gate signals to the vertical blanking signal. That is, the horizontal early and late gate signals corresponding to the first and second fields of the video signals are of substantially the same duration, but the timing of the vertical early and late gate signals corresponding to the second field is offset by a predetermined value in comparison to the timing of the vertical early and late gate signals corresponding to the first field.

The timing of the sampling signals provided by the synchronous clock 44 to the sample and hold circuits 46 and 48 is illustrated by the waveform 7D. The sample and hold circuits 46 and 48 sample the output of the azimuth and elevation accumulators 40 and 42 respectively in response to alternate pulses in the waveform of 7D. That is, the sample and hold circuit 46 samples the output of the azimuth accumulator 40 in response to the pulse in the waveform 7D occurring at the time $t_3$, and the sample and hold circuit 48 samples the output of the elevation accumulator 42 in response to the pulse of the waveform 7D occurring at time $t_9$. The next pulse in the waveform 7D will then cause the sample and hold circuit 46 to again sample the output of the azimuth accumulator 40. This staggering of the pulses provided to the sample and hold circuits 46 and 48 on an alternative basis is further described in the waveform 7G and 7H whose pulses correspond to the pulses in waveform 7D.

The waveforms 7G and 7H sample the sample and hold circuits 46 and 48, respectively.

In accordance with the preceding description, the signals provided to the multiplier 262 through the channel select switch 250 from the azimuth accumulator 40 and the sample and hold network 46, or the signals provided through the channel select switch 250 from the elevation accumulator 42 and the sample and hold network 48, correspond to the error signals determined by the respective accumulators on successive fields of the video signal. That is, for the azimuth and elevation error signals provided by the azimuth and elevation accumulators 40 and 42 to the switches 256 and 252 respectively, the outputs of the sample and hold circuits 46 and 48 will provide the azimuth or elevation error signal corresponding to the previous field through the switches 258 and 254 to the $x_1$ input of the multiplier 262. The waveforms 7B, 7G and 7H show that the sampling of the sample and hold circuits 46 and 48 is correlated with the channel select signal which controls the channel select switch 250 such that the sample and hold circuit 46 samples the output of the azimuth accumulator 40 only during the first field of the video signal and that the sample and hold circuit 48 samples the output of the elevation accumulator 42 only during the second field of the video signal. Specifically, at time $t_3$, when the channel select signal indicates that the first field is present, the sampling signal provided to the sample and hold circuit 46 causes the output of the azimuth accumulator 40 to be stored in the sample and hold circuit 46. Similarly, when the channel select signal corresponds to the second field, the waveform 7H shows that the sample signal is provided to the sample and hold circuit 48 to sample the output of the elevation accumulator 42. Furthermore, the waveform 7B and FIG. 6 illustrate that the switches 252 and 254 are closed during the time of the first field when the azimuth accumulator 40 is sampled by the sample and hold circuit 46 while the switches 256 and 258 are opened, and that during the second field the switches 256 and 258 are closed while the sample and hold circuit 48 samples the output of the elevation accumulator 42 and the switches 252 and 254 are open. Accordingly, while the elevation error signals corresponding to successive fields of the video signal are provided to terminals $x_1$ and $x_2$ of the multiplier 262 through the switches 254 and 252, the sample signal is provided to the sample and hold circuit 46 to sample the output of the azimuth accumulator 40. Similarly, when the switches 258 and 256 are closed and the switches 254 and 252 are open, so that the sample and hold circuit 46 and the azimuth accumulator 40 provide output signals through the switches 258 and 256 to the terminals $x_1$ and $x_2$, the sample and hold circuit 48 is provided with a sample signal to sample the output of the elevation accumulator 42.

As will be described in relation to the waveforms of FIG. 8, the multiplier 262, the ramp generator 264, the comparator 266, the one shot multivibrator 268, and the store flip-flop 270 of the target gain control 50 cooperate to determine an elevation normalization factor ($M_y$) in response to output signals from the elevation accumulator 42 and the sample and hold circuit 48 and then normalize the elevation error signal stored in the sample and hold network 48 to provide a normalized elevation error signal to the sample and hold network 54. Likewise, when the channel select switch 250 is in its opposite position with the switches 256 and 258 closed and the switches 252 and 254 open, the target gain control 50 determines the azimuth normalization factor ($M_x$) in response to the output signals of the sample and hold circuit 46 and the azimuth accumulator 40, and normalizes the azimuth error output signal of the sample and hold circuit 46 to provide a normalized azimuth error signal to the sample and hold circuit 52. The normalized azimuth and elevation signals provided by the target gain control 50 to the sample and hold circuits 52 and 54, respectively, are sampled in response to azimuth and elevation output signals provided by the synchronous clock 44.

As is explained in relation to FIG. 8, the determination of the azimuth and elevation normalization factors ($M_x$) and ($M_y$) by the target gain control 50 is determined over the duration of the pulses of the sweep run out delay signal of waveform 7E. The determination of the azimuth normalization factor ($M_x$) is determined on alternate pulses and the elevation normalization factor ($M_y$) is determined on the remaining pulses so that, for example of the waveforms of FIG. 7, the determination of the azimuth normalization factor ($M_x$) and the normalization of the azimuth error signal provided by the sample and hold circuit 46 is accomplished within the time interval $t_{10}$ to $t_{11}$. Likewise, the determination of the elevation normalization factor ($M_y$) and the normalization of the elevation error signal provided by the sample and hold circuit 48 is made over the duration of the pulse between times $t_4$ and $t_5$. Accordingly, the target gain control 50 will provide a normalized elevation error signal in response to video signals corresponding to the first field received between times $t_0$ and $t_6$, and will also provide normalized azimuth error signals in response to video signals corresponding to the second field which are provided over the time $t_6$ to $t_{12}$. That is, while the azimuth error signal of the azimuth accumulator 40 is stored in the sample and hold circuit 46 during the first field, the target gain control 50 provides a normalized elevation error signal to the sample and hold circuit 54. Conversely, when the elevation error signal of the elevation accumulator 42 is stored in the sample and hold circuit 48 during the second field of the video signal, the target gain control 50 provides a normalized azimuth error signal to the sample and hold circuit 52. Accordingly, the azimuth and elevation output sample signals, which are shown as waveform 7F, are provided to the sample and hold circuits 52 and 54 in a staggered relation as illustrated in the waveforms 7I and 7J. The video tracker 26 thereby provides a normalized elevation error signal in response to the first field of each frame of the video signal, and also provides a normalized azimuth error signal in response to the video signals of the second field of the video signal frame.

The operation of the target gain control 50 in determining the azimuth and elevation normalization factors ($M_x$) and ($M_y$) and normalizing the azimuth and elevation error signals of the azimuth and elevation accumulators 40 and 42 is more particularly described in relation to the waveforms of FIG. 8. Waveform 8A represents the vertical early and late gate signals which were shown in waveform 7C of FIG. 7. Waveforms 8B and 8C show the output of the elevation and azimuth accumulators 42 and 40, respectively. As seen in the waveforms 8B and 8C, the accumulators 42 and 40 begin accumulating the partial integrations of the time discriminator 36 over each horizontal sweep of the track window when the vertical early gate is opened at time $t_1$. The small steps in the waveforms 8B and 8C between the times $t_1$ and $t_3$ illustrate the incremental changes in the output of the accumulators 42 and 40 as they add the output of the integrating capacitors of the time discriminator 36 to complete the double integration of the video signal over the tracking window as was described in relation to equations (1) and (2). At time $t_3$, when the vertical late gate signal is closed, the accumulators 42 and 40 have completed the integration function of the video signal and maintain their output values until they are reset by a reset signal illustrated by the waveform 8I.

Waveforms 8B and 8C also show that, as the outputs of the time discriminator are being stored in the azimuth and elevation accumulators 40 and 42, the azimuth and elevation accumulators typically exhibit different characteristic integration patterns. The difference in integration patterns requires a different degree of dynamic range for the azimuth and elevation accumulators. This difference in integration patterns is due to the fact that the partial horizontal integration which is stored in the azimuth accumulator is performed for each half of the horizontal dimension of the track window at the time it is stored in the azimuth accumulator 40 and, unlike the video signals integrated by the elevation accumulator 42, the sign of the video signals is not inverted for the vertical integration period of the azimuth accumulator 40. Of course, under given conditions of target position and contrast, the integration patterns of the azimuth and elevation accumulators 40 and 42 would bear no particular resemblance to the characteristic integration patterns illustrated in the waveforms 8B and 8C. Nevertheless, the disclosed target gain control circuit 50 would perform equally well since its performance is independent of the nature of the integration pattern of the accumulators. An example of this is shown by the elevation accumulator integration performed over the time period $t_{13}$ to $t_{14}$ which indicates a target of negative contrast but with the same error direction as for the prior integration periods. Equivalently, the integration period $t_{13}$ to $t_{14}$ could be described as indicating a target of positive contrast but with an error direction of opposite sign with respect to that indicated by the previous integration periods. Similarly, in the waveform 8C, which illustrates the integration of the azimuth accumulator 40, the integration period between times $t_{15}$ and $t_{16}$ indicates a target with the same direction of azimuth deviation but of an opposite contrast. Equivalently, the integration period $t_{15}$ to $t_{16}$ could also be described as indicating a target of the same contrast as the previous integration periods but having an azimuth deviation of the opposite sign.

As was previously explained in relation to FIG. 7 and, more specifically, in relation to FIGS. 7G and 7H, the sample and hold circuits 46 and 48 sample the accumulators 40 and 42 on alternate fields of the video signal in response to the azimuth accumulator sample signal and the elevation accumulator sample signal which are staggered with respect to each other. As was also explained previously, the operation of the channel select switch 250 is synchronized with the fields of the video signal in response to the channel select signal of waveform 7B such that, while the integration of the azimuth accumulator 40 is sampled by the sample and hold circuit 46, the integration of the elevation accumulator 42 is provided to the $x_2$ input of the multiplier 262, and the output of the sample and hold circuit 48, which represents the elevation error signal of the previous field, is provided to the $x_1$ input of the multiplier 262. Conversely, when the elevation error signal of the elevation accumulator 42 is sampled by the sample and hold circuit 48, the output of the azimuth accumulator 40 and the sample and hold circuit 46, which represents the azimuth error signal of the previous field, are provided to the $x_2$ and $x_1$ inputs of the multiplier 262. This multiplexing action of the multiplier 262 between the azimuth and elevation accumulators 40 and 42 and the sample and hold circuits 46 and 48 is described for the typical waveforms presented in FIG. 8. Waveform 8E represents the $x_2$ input to the multiplier 262. This $x_2$ input is comprised of alternate pulses from the elevation and azimuth accumulator output signals of waveforms 7B and 7C as controlled by the channel select switch 250. At times $t_1$ to $t_4'$, the waveform 8E shows that the signal provided to the $x_2$ input to the multiplier 262 corresponds to the output of the elevation accumulator 42 illustrated in waveform 8B. The $x_1$ input to the multiplier 262 corresponding to the $x_2$ input between the times $t_1$ and $t_4'$ is the output of the sample and hold circuit 48 which was stored during the previous field time of the waveforms. At times $t_7$ to $t_{10}'$, waveform 8E shows that the signal provided to the $x_2$ input to the multiplier 262 corresponds to the output of the azimuth accumulator 40 illustrated in waveform 8C. The $x_1$ input to the multiplier 262 which corresponds to the $x_2$ input between the times $t_7$ and $t_{10}'$ is the output of the azimuth accumulator 40 shown in waveform 8C between times $t_3$ and $t_4'$ which was stored in the sample and hold circuit 46 in response to the pulse provided at time $t_3$ shown in waveform 8D. As shown in waveform 8E, the $x_2$ input to the multiplier 262 provided a between the times $t_{13}$ and $t_{14}$ corresponds to the output of the elevation accumulator 42 shown in waveform 8B. The corresponding $x_1$ input to the multiplier 262 comprises the elevation accumulator signal which was integrated between the times $t_7$ and $t_9$ and which was stored in the sample and hold circuit 48 at time $t_9$ in response to a pulse in the waveform 8D. This multiplexing cycle, which proceeds as described above for the subsequent operation of the target gain control 50, is employed in the preferred embodiment of the present invention for the reason that it permits the determination of the azimuth and elevation normalizing factors ($M_x$ and $M_y$) and the determination of the normalized azimuth and elevation error signals by the target gain control 50 with the use of a single multiplier 262. This multiplexing arrangement is significant in that the preferred embodiment of the present invention is designed for use on austere electro-optical tracking systems and the multiplier 262 is the most expensive single component in the disclosed video tracker.

As was previously stated, the multiplier 262, the ramp generator 264, the comparator 266, the one shot multivibrator 268 and the store flip-flop 270 cooperate to determine the azimuth and elevation normalization factors ($M_x$ and $M_y$) and also normalize the gain of the azimuth and elevation error signals stored in the sample and hold circuits 46 and 48 over the duration of the sweep run out delay signal of waveform 7E. This sweep run out delay signal is rewritten in FIG. 8 as waveform 8F. Specifically, the sweep run out delay signal is a timing signal which is internal to the synchronous clock 44. As was described previously, the horizontal and vertical early and late gate signals provided by the time modulator 34 to the time discriminator 36 corresponding to a first field time of the video signals are offset with respect to the horizontal and vertical early and late gate signals corresponding to a second field time of the video signal so that the track window defined by the set of gate signals corresponding to the first field time is offset in the horizontal and vertical dimensions by a known amount with respect to the track window defined by the gate signals corresponding to a second field time. Also in accordance with the previous description, the azimuth error accumulator 40 and the sample and hold circuit 46 cooperate with the channel select switch 250 to provide the azimuth error signal corresponding to the second field time to the $x_2$ input of the multiplier 262 and to provide the azimuth error signal corresponding to the first field time to the $x_1$ input of the multiplier 262 during the second field time of the video signals. Similarly, the elevation accumulator 42 and the sample and hold circuit 48 cooperate with the channel select switch 250 to provide the elevation error signal corresponding to the first field time to the $x_2$ input of the multiplier 262 and to provide the elevation error signal corresponding to the second field time to the $x_1$ input of the multiplier 262 during the first field time of the video signals.

As was previously described in relation to FIG. 3, the horizontal and vertical offset of the track windows corresponding to the first and second field times is a known constant the magnitude of which is established in the design of the time modulator 34. Also, the signals provided to the $x_1$ input by the sample and hold circuits 46 and 48 represent the error signals for the opposite field from the field of the error signals provided by the accumulators 40 and 42 to the $x_2$ input terminal. Therefore, in accordance with the theory previously described in relation to FIG. 3, the normalization factors ($M_x$ and $M_y$) can be established by providing the value to the $y$ input of the multiplier 262 which is sufficient to produce an output signal that is substantially equal to the constant $C_0$ which is established as the difference between normalized error signals from the two track windows corresponding to the first and second fields, since these track windows are offset by the known amount defined by the gate signals for the first and second field times.

To determine the value of the normalization factors $M_x$ and $M_y$ for each comparison of azimuth or elevation error signals occurring in successive track windows, the ramp generator 264 is reset by a signal from the synchronous clock 44. The timing of the reset signal is similar to the waveform 8D such that, between the times $t_3$ and $t_4$, the output of the ramp generator 264 is reduced from the previously determined normalization factor ($M_x$) to its initial condition. Corresponding to the resetting of the ramp generator 264, the output signal of the comparator 266 also changes state at the time $t_3$ causing the one shot multivibrator 268 to provide an output signal to the store flip-flop 270 that causes the store flip-flop 270 to change state. At time $t_4$, after the ramp generator 264 has been reset by the synchronous clock 44, the output signal of the ramp generator increases in a linear ramp fashion as illustrated in the waveform 8G of FIG. 8. Also at time $t_4$, the sweep run out delay signal is provided by the synchronous clock 44 to delay the transmission of the azimuth and elevation output sample signals to the sample and hold circuits 52 and 54 until the target gain control 50 has normalized the azimuth or elevation error signal as shown by the waveforms 8F and 8J. The output level of the ramp generator 264 continues to increase in a linear fashion from the time $t_4$ until the comparator 266 determines that the output of the multiplier 262 is substantially equal to the constant value $C_0$ such that the signal provided by the ramp generator 264 is substantially equal to the normalization factor $M_y$ in accordance with the previously developed theory of equations (3) through (11). In the waveforms of FIG. 8, the point at which the output of the multiplier 262 reaches the constant value $C_0$ as determined by the comparator 266 is illustrated as time $t_4'$. When the comparator 266 determines that this equality exists, an output signal is provided to the one shot multivibrator 268 which provides an output signal to the store flip-flop 270 causing the output of the flip-flop 270 to again change state as illustrated in FIG. 8 by the waveforms 8G and 8H. The change in state of the output signal of the flip-flop 270 causes the ramp generator 264 to stop increasing the level of its output signal and hold the ramp generator output signal at its present level which, for the position of the switch 250 in FIG. 6 and at the time $t_4'$ in FIG. 8, represents the elevation normalization factor $M_y$. At this point, the target gain control 50 has determined the elevation normalization factor $M_y$, but it remains for the target gain control 50 to normalize one of the elevation error signals provided by the elevation accumulator 42 in the sample and hold circuit 48 with respect to this determined normalization factor.

Accordingly, the synchronous clock 44 provides a reset signal to the azimuth and elevation accumulators 40 and 42 causing the input signal to the $x_2$ input terminal of the multiplier 262 to go to zero. This accumulator reset signal provided by the synchronous clock 44 is illustrated as the waveform 8I in FIG. 8. With the azimuth and elevation accumulators 40 and 42 set to zero, the output of the multiplier 262 is equal to the product of the elevation normalization factor $M_y$ times the elevation error signal provided to the $x_1$ terminal by the sample and hold network 48. This elevation error signal corresponds to the elevation error signal determined for the field time preceding the time period $t_0$ to $t_6$. The normalized elevation error signal is provided to the sample and hold circuit 54 and is sampled and held in the circuit 54 in response to a sample output signal which occurs upon the expiration of the pulse of the sweep run out delay signal. The normalized sample output signal for both the sample and hold networks 52 and 54 is illustrated by the waveform 8J in which alternate pulses are provided to the sample and hold circuit 54 and then to the sample and hold circuit 52.

For the second field time of $t_6$ to $t_{12}$, the target gain control 50 will determine an azimuth normalization factor $M_x$ and then multiply the azimuth error signal stored in the sample and hold circuit 46 by this azimuth normalization factor to provide a normalized azimuth error signal to the sample and hold network 52 in a manner that is analogous to that described above for the determination of the elevation normalization factor $M_y$ and the normalized elevation error signal.

In accordance with the foregoing description of the preferred embodiment of the present invention, it will be seen that the disclosed volumetric balance video tracker 26 provides normalized azimuth and elevation error signals to control the scanning of a sensor in an electro-optical tracking system. The azimuth track point for the sensor is determined by comparing the integral of the video signals in the right half of the track window with the integral of the video signals in the left half of the track window and determining an azimuth error signal in relation to a balanced condition between the two integrals. Similarly, the elevation track point is determined by comparing the integral of the video signals in the top half of the track window with the integral of the video signals in the bottom half of the track window and detecting elevation error signals in relation to a balance condition between the two integrals. In addition, the azimuth and elevation error signals are normalized by a target gain control 50. The target gain control 50 determines azimuth and elevation normalization factors with respect to the gain of the azimuth and elevation error signals for track windows that are offset by a known displacement in the horizontal and vertical dimensions in comparison to a normalized gain for the azimuth and elevation error signals. The azimuth and elevation error signals are then multiplied by these azimuth and elevation normalization factors to provide normalized azimuth and elevation error signals at the output of the volumetric balance video tracker 26.

I claim:

1. A video tracker for controlling the scanning of a sensor that provides video signals corresponding to its field-of-view, said tracker comprising:
   a time modulator for providing early and late gate signals that define a tracking window within the field-of-view of said sensor;
   a time discriminator that is responsive to the early and late gate signals for partially integrating the video signals that occur within the tracking windows defined by the early and late gate signals to generate partial tracking error signals; and
   an accumulator that is responsive to said partial tracking error signals for adding the partial tracking error signals of the time discriminator to provide tracking error signals.

2. A linear video tracker for controlling the scanning of the field-of-view of a sensor that provides linear video signals, said tracker comprising:
   a time modulator for providing early and late gate signals that define first and second tracking windows within first and second fields-of-view of said sensor;
   a time discriminator that is responsive to said time modulator for partially integrating the linear video signals over said early and late gate signals defining to provide partial tracking error signals; and
   an accumulator that is responsive to said time discriminator for adding the partial tracking error signals of the time discriminator to provide tracking error signals.

3. A video tracker for controlling the scanning of a sensor in an electro-optical tracking system in which the sensor provides linear video signals in response to a field-of-view, and in which a synchronous decoder decodes horizontal blanking pulses, vertical blanking pulses, and dither signals, said tracker comprising:
   a time modulator for defining a tracking window within a field-of-view of the sensor in response to horizontal blanking pulses, vertical blanking pulses, and dither signals from the synchronous decoder of the television system;
   a time discriminator that cooperates with the time modulator to integrate the video signals over an axis of the sensor field-of-view to provide partial tracking error signals; and
   an accumulator that cooperates with the time discriminator to integrate the partial tracking error signals to provide tracking error signals for controlling the sensor field-of-view.

4. A linear video tracker for controlling the scanning of a sensor in an electro-optical tracking system in which the sensor provides linear video signals in response to a field-of-view, said tracker comprising:
   a time modulator for providing horizontal early and late gate signals, and for providing vertical early and late gate signals that define a tracking window within the field-of-view of said sensor;
   a time discriminator that is responsive to the horizontal and vertical early and late gate signals for normalizing the linear video signals with respect to the area of the tracking window defined by the horizontal and vertical early and late signals, and for integrating the linear video signals over an axis of the sensor field-of-view between the limits of said horizontal early and late gate signals; and
   an accumulator that is responsive to the integrals of the video signals provided by said time discriminator for adding said integrals over a second axis of the sensor field-of-view between the limits of said vertical early and late gate signals to provide tracking error signals.

5. A linear video tracker for controlling the scanning of a sensor in an electro-optical tracking system in which the sensor provides linear video signals in response to a field-of-view, and in which a synchronous decoder decodes horizontal blanking pulses, vertical blanking pulses, and dither signals in response to the video signals, said tracker comprising:
   a time modulator for providing horizontal early and late gate signals, and for providing vertical early and late gate signals that define a tracking window within the field-of-view of said sensor in response to the horizontal and vertical blanking signals from the synchronous decoder;
   a time discriminator that is responsive to the linear video signals of said sensor and to the horizontal and vertical early and late gate signals of said time modulator, said time discriminator being operative to normalize the linear video signals with respect to the area of the tracking window defined by said horizontal and vertical early and late gate signals, and also being operative to integrate the linear video signals over one axis of the field-of-view between the limits of said horizontal early gate signals and to integrate the linear video signals over one axis of the field-of-view between the limits of said horizontal late gate signals; and
   an accumulator that is responsive to the integrals of the video signals determined by said time discriminator, for adding the integrals of the video signals determined by said time discriminator over a second axis of the field-of-view between the limits of said vertical early and late gate signals to provide azimuth and elevation error signals.

6. A video tracker for controlling the scanning of a sensor in an electro-optical tracking system in which the sensor provides linear video signals in response to a field-of-view, said tracker comprising:
   a time modulator for defining first and second tracking windows within first and second fields-of-view of the sensor;
   a time discriminator that is responsive to the output of the time modulator for integrating the video signals over one axis of the sensor field-of-view;
   an accumulator that is responsive to the output of the time modulator for integrating the output of the time discriminator over a second axis of the sensor field-of view within the limits of the tracking window; and a target gain control that is responsive to a first output of said accumulator corresponding to the first field-of-view of said sensor, and that is also responsive to a second output of said accumulator corresponding to the second field-of-view of said sensor for multiplying the difference of said first and second accumulator outputs by a factor such that the output of said multiplier is substantially equal to a predetermined constant, and for multiplying one of the first and second outputs of said accumulator by this factor to provide an output error signal having a normalized gain with respect to the displacement of the volumetric centroid of the target from the center of the window of said field-of-view corresponding to said one of the first and second outputs of said accumulator.

7. A linear video tracker for controlling the scanning of the field-of-view of an optical sensor in an electro-optical tracking system, in which a synchronous decoder is responsive to video signals of the sensor to provide horizontal blanking signals, vertical blanking signals and dither signals said tracker comprising:

a time modulator that is responsive to a dither signal and the horizontal and vertical blanking signals of the synchronous decoder to provide horizontal and vertical early and late gate signals that define first and second tracking windows within first and second fields-of-view of the optical sensor;

a time discriminator that is responsive to the linear video signals of said optical sensor, and that is responsive to the horizontal and vertical early and late gates of said time modulator, said time discriminator being operative to integrate the video signals of said optical sensor over one axis of the field-of-view between the limits of the horizontal early and late gate signals for the first and second fields-of-view of said optical sensor;

an accumulator that is responsive to the integrals provided by said time discriminator for integrating said integrals over a second axis of said first and second fields of said optical sensor between the limits of said vertical early and late gate signals of said time modulator to provide first and second azimuth and elevation error signals; and a target gain control that is responsive to the first and second azimuth error signals to determine a normalization factor for the gain of said azimuth error signals, and to correct the gain of said azimuth error signals with respect to said normalization factor.

8. The apparatus of claim 7 wherein said target gain control is further operative to determine a normalization factor for the gain of said elevation error signals, and to correct the gain of said elevation error signals with respect to said normalization factor.

9. A video tracker for use in an electro-optical tracking system that determines tracking error signals in response to the video signals within a tracking window of an optical sensor field-of-view, wherein the improvement comprises:

a target gain control that normalizes the gain of the tracking error signal with respect to the displacement of the target from the center of the tracking window by multiplying the difference between tracking error signals corresponding to first and second tracking windows by a normalizing factor sufficient to obtain a product substantially equal to a constant value, and by multiplying the tracking error signal corresponding to one of said tracking windows by said normalizing factor to normalize the gain of the tracking error signal.

10. A video tracker for use in an electro-optical tracking system, said video tracker providing tracking error signals to control the scanning of an optical sensor in response to the video signals within a tracking window of an optical sensor field-of-view, said video tracker comprising:

a multiplier that is responsive to first and second tracking error signals corresponding to first and second tracking windows respectively, said multiplier being operative to multiply the difference of said first tracking error signal less said second tracking error signal by a normalizing factor;

a comparator for comparing the output of said multiplier with a constant value that is substantially equal to the difference between said first and second tracking error signals corresponding to a normalized gain of said tracking error signals with respect to the displacement of said first and second tracking windows;

a ramp signal generator that is responsive to said comparator and operative with said multiplier for increasing the value of the normalizing factor provided to said multiplier until said comparator determines that the product signal of the multiplier is substantially equal to said constant value; and means for setting the tracking error signal corresponding to said second tracking window to zero after said comparator determines that the product signal of the multiplier is substantially equal to the constant value such that said multiplier determines the product of said normalizing factor and the first tracking error signal to provide a normalized tracking error signal.

11. The apparatus of claim 10 wherein said setting means comprises:

a switch for setting the second tracking error signal to zero.

12. A target gain control for use in a video tracker that provides tracking error signals to control the scanning of an optical sensor in response to the video signals of a tracking window within the field-of-view of the optical sensor, said target gain control comprising:

a multiplier for multiplying the difference between tracking error signals corresponding to first and second tracking windows by a normalizing factor;

a comparator for comparing the product of said multiplier with a constant value that is substantially equal to the difference between said tracking error signals for a normalized gain of said tracking error signals with respect to the displacement of said first and second tracking windows; and a ramp signal generator for increasing the value of the normalizing factor provided to said multiplier until said comparator determines that the product signal of the multiplier is substantially equal to said constant value.

13. A method for controlling the scanning of a sensor that provides video signals corresponding to its field-of-view, said method comprising:

providing early and late gate signals that define a tracking window within the sensor field-of-view;

partially integrating the video signals that occur within the tracking windows defined by the early and late gate signals to generate partial tracking error signals; and adding the partial tracking error signals to provide tracking error signals for controlling the scanning of the sensor.

14. A method for controlling the scanning of a sensor in an electro-optical tracking system in which the sensor provides linear video signals in response to a field-of-view, said method comprising:

defining first and second tracking windows within first and second fields-of-view of the sensor;

integrating the video signals over one axis of the first and second fields-of-view of the sensor within the limits of the first and second tracking windows to provide first and second partial tracking error signals;

integrating said first and second partial tracking error signals over a second axis of the first and second fields-of-view of the sensor to provide first and second tracking error signals;

multiplying the difference between said first and second tracking error signals by a normalizing factor such that the product of said normalizing factor and the difference between said tracking error signals is substantially equal to a predetermined constant; and multiplying one of the first and second tracking error signals by said normalizing factor to provide an output error signal having a normalized gain with respect to a predetermined measurement parameter.

15. A method for normalizing the gain of the tracking error signal that is determined in response to the video signals within a tracking window of an optical sensor field-of-view, said method comprising:

multiplying the difference between first and second tracking windows corresponding to first and second tracking windows that are offset with respect to each other by a normalizing factor such that the product is substantially equal to a predetermined value; and multiplying the tracking error signal corresponding to one of said tracking windows by said normalizing factor to normalize the gain of the tracking error signal with respect to the displacement of the target from the center of the tracking window.

* * * * *